US006915243B1

(12) United States Patent
Inoue et al.

(10) Patent No.: US 6,915,243 B1
(45) Date of Patent: Jul. 5, 2005

(54) SURFACE TOPOLOGY AND GEOMETRY RECONSTRUCTION FROM WIRE-FRAME MODELS

(75) Inventors: Keisuke Inoue, Sagamihara (JP); Kenji Shimada, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 1069 days.

(21) Appl. No.: 09/648,139

(22) Filed: Aug. 25, 2000

(51) Int. Cl.[7] .............................................. G06F 17/10
(52) U.S. Cl. .......................................... 703/2; 345/418
(58) Field of Search ............................. 703/2; 345/418, 345/419, 420, 421

(56) References Cited

U.S. PATENT DOCUMENTS

| | | | | |
|---|---|---|---|---|
| 4,901,252 A | * | 2/1990 | Fitzgerald et al. | 345/421 |
| 5,465,323 A | * | 11/1995 | Mallet | 345/423 |
| 5,793,372 A | * | 8/1998 | Binns et al. | 345/419 |
| 6,762,759 B1 | * | 7/2004 | Lake et al. | 345/426 |
| 2003/0128209 A1 | * | 7/2003 | Maekawa et al. | 345/420 |

OTHER PUBLICATIONS

Bagali et al., "A Shortest Path Approach To Wireframe To Solid Model conversion", ACM Digital Library, 1995.*

* cited by examiner

Primary Examiner—Leo Picard
Assistant Examiner—Carlos Ortiz-Rodriguez
(74) Attorney, Agent, or Firm—Whitham, Curtis & Christofferson, P.C.; Stephen C. Kaufman

(57) ABSTRACT

A method, a system, and a program product for reconstructing surface geometry from discrete points on an object are disclosed. The method comprises steps of; providing input data derived from said discrete points; generating a graph from said input data, said graph including biconnected graphs; subjecting said graph to triconnected component decomposition to generate a component graph; generating all possible embeddings including possible face loops from said surface geometry; filling said possible face loops with possible surface to reconstruct said surface geometry; examining geometrical acceptance of said surfaces and omitting embeddings, including at least one geometrically unacceptable surface from computation thereafter and scoring said embeddings depending on said examination; and sorting said embeddings with respect to said scores to select embeddings for reconstructing said surface geometry.

20 Claims, 21 Drawing Sheets

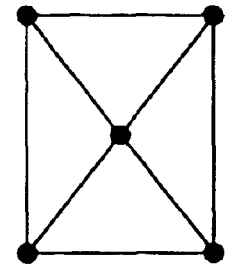
TRICONNECTED GRAPH
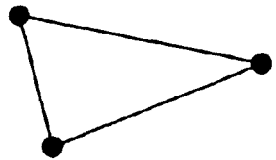
TRIANGLE GRAPH
3-BOND GRAPH
FIG.2

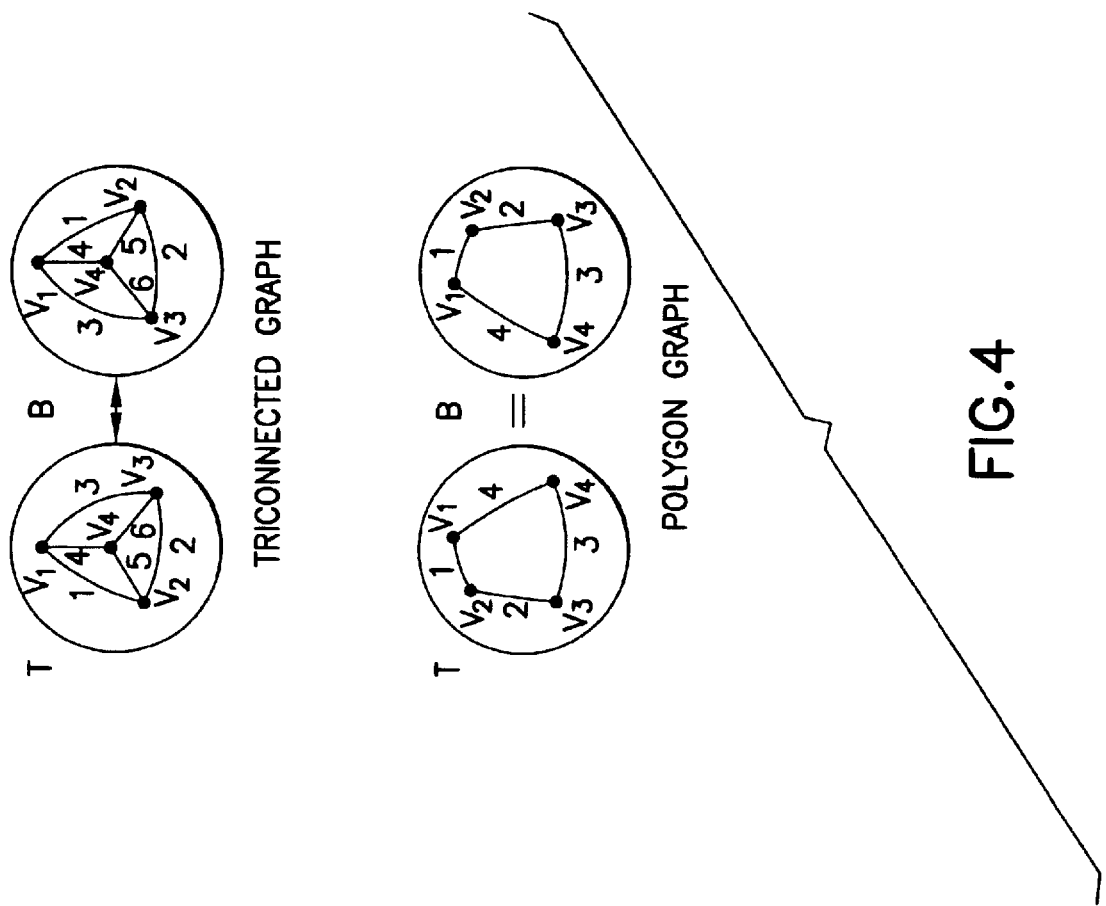
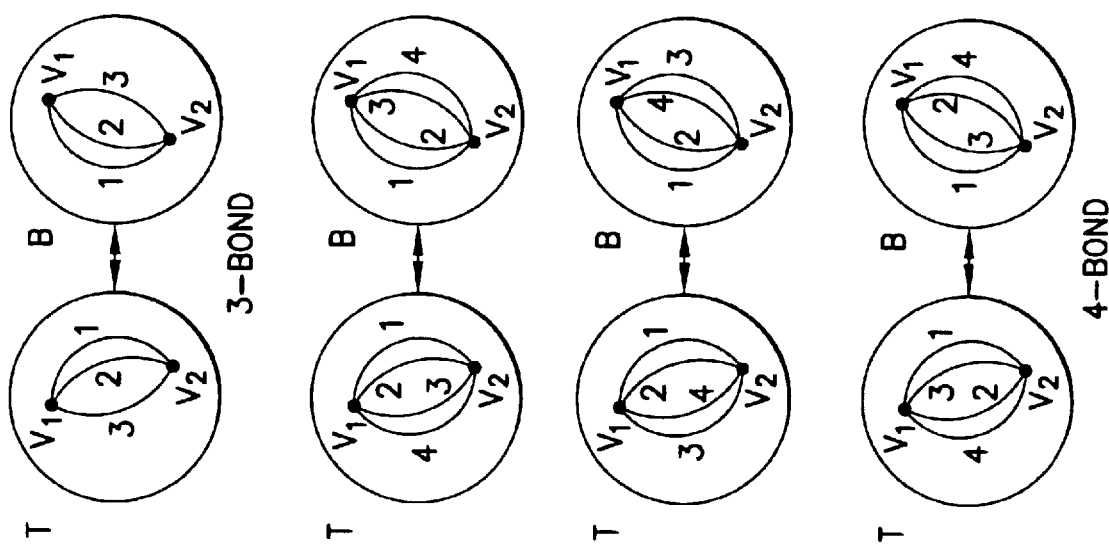
FIG. 4

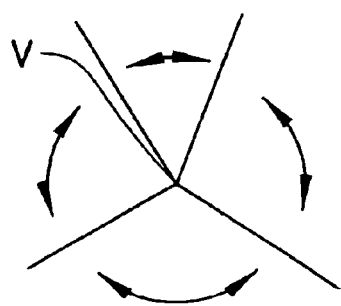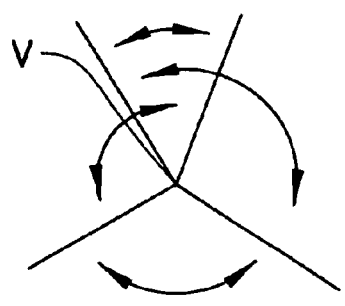
FIG.9

```
Queue = empty;
forall (embeddings) {
    Score = 0;
    forall (loops) {
        Evaluate the loop;
        If (acceptable) Accumulate the evaluated value to Score;
        else
                goto next_embed;
    }
    forall (vertices) {
        Evaluate the combination of loops around v;
        If (acceptable) Accumulate the evaluated value to Score;
        else
                goto next_embed;
    }
    forall (edges) {
        Evaluate a pair of loops;
        If (acceptable) Accumulate the evaluated value to Score;
        else
                goto next_embed;
    }
    Register in Queue the pair of the embedding and computed Score;
next_embed;
}
if (Queue is not empty) {
    Sort the Queue based on Scores;
}
```

FIG.10

SURFACE TOPOLOGY AND GEOMETRY RECONSTRUCTION FROM WIRE-FRAME MODELS

FIELD OF THE INVENTION

The present invention relates to surface topology and geometry reconstruction of wire-frame models, and particularly relates to a method, a system and a program product for reconstruction of surface topology and geometry.

BACKGROUND OF THE INVENTION

A problem of reconstructing a three-dimensional solid structure from a wire-frame has been widely studied and developed so far. Methods for reconstruction of the three-dimensional solid structure include a finding method using geometric information and a method using a graph theory etc. However, the conventional methods are applied only to triconnected graphs because an input wire-frame model is assumed to have an interpretation, i.e., an embedding determined in one-to-one correspondence to the input wire-frame model. Entire triconnected graphs form a subgroup of entire biconnected graphs, and generally require more dense geometrical connection relations, i.e., edges between vertices than the biconnected graphs. It is not ensured that the real wire-frame model satisfies the above assumption, and therefore the quite many restrictions are present in the conventional method which assumes the input graphs as triconnected ones. Since there are three-dimensional solids which may be categorized to the graphs other than biconnected or connected graphs, it is necessary to reduce the restriction in order to provide wide availability to a system used for actual computation of the real three-dimensional solids. In turn, there may be various interpretations for graphs other than triconnected graphs such as, for example, the biconnected or connected graphs, thereby providing another problem for providing wide availability to the three-dimensional designing.

The wire-frame model has been widely used in various fields, particularly in the field of a Computer Aided Design (CAD) system where three-dimensional geometry construction is necessary. In the three-dimensional geometry design field, sometimes a solid or a surface may be represented as a group consisting of curved segments. Such representations are not considered to be complete geometry representations because locations of surfaces are not clearly indicated. However, an exact interpretation of the solid is made possible when combined with knowledge of an operator on the subjected solid. Such the representation could be realized by aid of with such knowledge.

In a practical site of automated design using CAD systems, the process, first deciding the entire shape using characteristic curves represented as a wire-frame by a designer and then filling the wire-frame with all of adequate surfaces by another operator, is sometimes adopted. This procedure is adopted such that the designers working for highly sophisticated shape design are not troubled by time-consuming procedure for putting surfaces thereon or filleting thereof; the actual large CAD model sometimes requires several days for the latter portion.

The quite many wire-frame models have been used in past huge design data because a computing cost including memory capacity, CPU time, and restriction on a software for directly subjecting the curved surface to computation becomes high and operations to define the curved surfaces precisely become elaborate. Even in the present stage, since an operator may understand more easily geometrical elements having lower dimension, such wire-frames are used as an intermediate procedure in order to define surface geometry using specific surfaces in the geometry design.

An essential difference between the wire-frame models and solid models is that the latter includes a group of surfaces defining boundaries of the object. The group of the surfaces forms a closed shell which cooperatively encloses a finite volume. Therefore, in order to construct automatically the solid model from the wire-frame model, it is required first to interpret the entire wire-frame as a group of face loops with topological consistency and second to define curved surface within each of the face loop. However, when the three-dimensional geometry design is extended to handle the solid represented as biconnected graphs, the conventional three-dimensional geometry design procedure encounters the problem in which a plurality of interpretations for the given wire-frame are impossible as reviewed in the mathematical procedure described above.

Therefore, there are continuous needs to provide a method, a system, and a program product to interpret a given wire-frame model consisted from groups of curves in space as consistent face loops, even if the input wire-frame has a plurality of interpretations, which are not computed by conventional methods, and to reconstruct surfaces of the object corresponding to each of the face loop efficiently and accurately.

DISCLOSURE OF THE PRIOR ART

Several conventional reconstruction methods have been proposed. For example, Siddarameshwar Bagali et al. discloses a finding method using geometric information and a method using a graph theory etc. in "A Shortest Path Approach To Wire-frame To Solid Model Conversions", Symposium on Solid Modeling and Applications, pp. 339–349, 1995.

J. Hopcroft et al. discloses triconnected component decomposition for biconnected graphs in "Dividing a Graph into Triconnected Decompositions", SIAM J. of Comput. Vol. 2, No. 3, 1973, in which biconnected graphs are decomposed into three kinds of elemental graphs and the disclosure thereof may be incorporated herein as reference.

SUMMARY OF THE INVENTION

Therefore, the present invention provides a novel method for reconstruction of the curved surface, the surface being interpreted as a group of face loops consistent for solids when a wire-frame model for the solid. In the present invention, the term "consistent" means that the surface is homeomorphic to a sphere. An input wire-frame is given as a set of curve segments in space, each of which can be a sequence of discrete points discrete points. The present invention may compute an input wire-frame which provides a plurality of interpretations that the conventional method could not proceed the computation. The method according to the present invention selects and ranks such interpretations according to geometric acceptance, thereby improving a computation cost, efficiency and workload of operators.

The essential feature of the present invention is to regard topological structures of the wire-frame model as a graph and the graph is then subjected to the triconnected component decomposition to obtain a set of components, or subgraphs. The components are then subjected to embedding onto the surface with genus 0, and then invert the derived components, thereby enumerating all of the possible embeddings for the graph. Next the present invention puts simple curved surfaces onto each of the face loop. When the biconnected rather than the triconnected graphs which may have a plurality of possible embeddings onto the sphere are computed, the possible surfaces are selected and ranked by evaluating characteristics of each face loop or evaluating states of boundaries between adjacent face loops based on the criteria that such surfaces provides simpler geometry and smaller areas as a whole. The method according to the present invention may also compute triconnected graphs subjected to the conventional procedure.

Another object of the present invention is to provide a system used for a three-dimensional geometry design and being implemented the method according to the present invention.

Still further object of the present invention is to provide a program product used for three-dimensional geometry design and for executing the method according to the present invention.

The method, the system and the program product according to the present invention have wide availability in the fields which require the three-dimensional geometry analysis, and particularly in the computer aided design (CAD) field.

BRIEF DESCRIPTION OF DRAWINGS

FIG. 2 shows examples three-bond graph, triangle graph, triconnected graph according to the present invention.

FIG. 4 shows sample embeddings for each type of the graphs according to the present invention.

FIG. 9 shows the embodiment in which overlap does not occur (a) and the embodiment in which overlap occurs (b) around the vertex V according to the present invention.

FIG. 10 shows a flow chart of selecting and ranking the embeddings according to the present invention.

BEST MODE FOR CARRYING OUT THE INVENTION

A. General Procedure of Embedding

Figure 1:
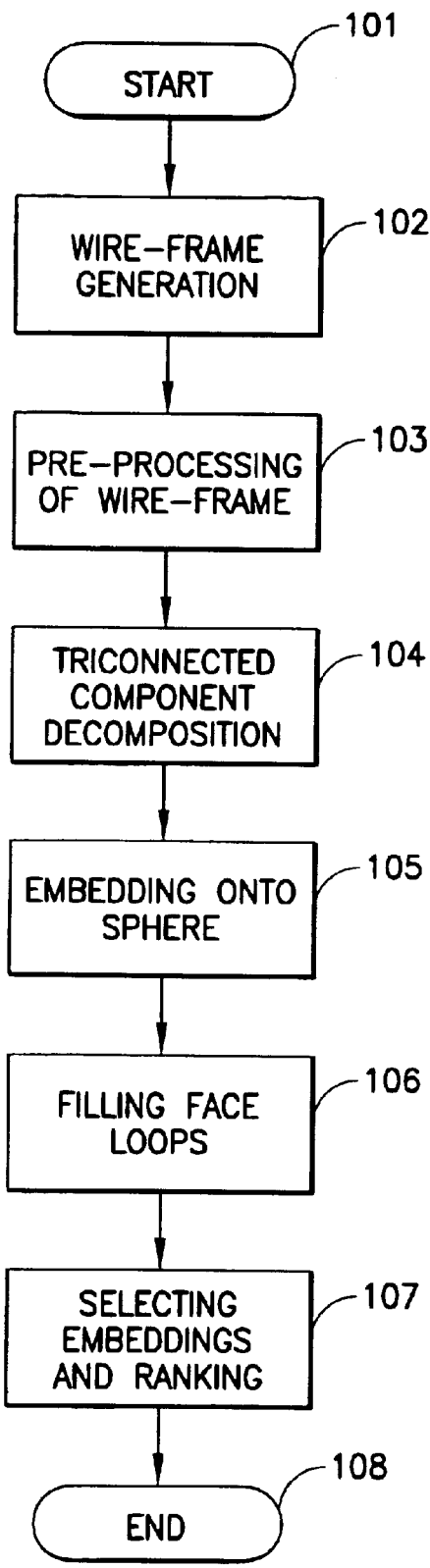
FIG. 1 shows a flow chart of a method according to the present invention.

FIG. 1 shows a flow chart of a method according to the present invention. The method according to the present invention starts from the step 101 and proceeds to the step 102 and provides a wire-frame representing a subjected solid. The generation of the wire-frame is not an essential part and therefore, does not described in detail. However, any conventional method to construct the wire-frame including discrete points used as input data for computation may be used in the present invention including automatic generation by the CAD system or even manual input may be possible.

There are no substantial limitation on the input wire-frame in the present invention, however, the input wire-frames may be preferably represented as graphs having undirected edges and further the input wire-frames may be assumed to satisfy the following condition;

(1) the input wire-frame (graph) should be a biconnected graph, and (2) the input graph should be a planar graph.

The condition of the biconnected graph provides less restrictions than the triconnected graph which is required in the conventional method. That is, the method according to the present invention may deal with wider range of graphs than those of the conventional method. According to the graph theory, the graph being biconnected and same time being not triconnected is known to have a plurality of embeddings.

The condition requiring the planar graph means that the graph, i.e., the wire-frame may be embedded onto an orientable surface with genus 0 such as, for example, a unit sphere. In other words, the solid represented by the wire-frame, i.e., input graph should not have a hole and a handle. This condition may be effective to reduce computation time and resources therefore, because determination of genus for an arbitrarily given graph is regarded as NP-complete.

Then the method proceeds to the step 103 and executes a pre-processing of the wire-frame. This pre-processing generates a new vertex at an intermediate point on a loop edge. The term "loop edge" used in the present invention means that the endpoints of the edge are the same with each other. In this pre-processing, the given wire-frame is transformed into a graph required for triconnected component decomposition without the loop-edge and without changing meaning of the problem. The step 103 may not be adopted in the present invention as far as the input graph does not require the pre-processing process.

Thereafter, the method proceeds to the step 104 to execute the triconnected component decomposition to obtain the set of triconnected components and then proceeds to the step 105 for embedding the input graph onto the sphere entirely under topological considerations. This process will be discussed in detail hereinafter. Then the method proceeds to the step 106 and put surfaces into the generated embeddings. Further the method proceeds to the step 107 and selects reasonable embeddings and ranking thereof under geometrical considerations and the method ends in the step 108. Although the processes from the step 105 to the step 107 are entirely independent processes theoretically, it may be possible to enhance the efficiency of the method according to the present invention by implementing in parallel in an actual system. The detailed processes for embedding and ranking described from the step 105 to the step 107 will be detailed hereinafter.

B. Mathematical Formularization of the Method

As described above, the input model according to the present invention is assumed to be a wire-frame model consisting of a set of curve segments. The segments of the curves represent a given solid structure as a whole in the present invention. The geometrical information of each of the segments of the curves may be given in parametric form or point sequence etc., but not limited thereto, any other format for the input wire-frame may be used in the present invention. In addition, topological information such as relations of the adjacent segments are assumed to be known in the present invention and the topological information of the wire-frame is assumed readily represented by graphs.

Generally speaking, there are a number of ways to interpret the graph as the solid structure topologically. That is to say, there are one or more ways for embedding the graph onto the orientable surfaces with finite genus. In a different embedding, the set of loops which represent the entire surface becomes different of course. Here, it is assumed to consider only the embedding onto the curved surface with the smallest genus of 0. A surface with a smaller genus represents a simpler shape, and therefore the simplest interpretation may be possible according to the above assumption, however, the present invention may be extended to include embeddings onto surfaces with higher genus.

Even if the embedding onto the orientable surface with the smallest genus is considered, there may be a plurality of possible interpretations, i.e., embeddings. When the interpretations, i.e., embeddings are considered by taking account of geometric information of a solid profile being industrially fabricated, all of the interpretation, i.e., embeddings may not be reasonable similarly. Therefore, the present invention outputs one or more reasonable embeddings which are selected from all of the topologically possible embeddings for a given wire-frame. The present invention further ranks the embeddings based on geometrical acceptability when the output includes a plurality of embeddings. The selection and the ranking may depend on the domain of objects subjected to the method according to the present invention.

1. Triconnected Component Decomposition

When a biconnected multi-graph with undirected edges, that is, the graph permitting a plurality of edges between a pair of vertices, is represented by G and the pair of vertices in G is represented $\{a, b\}$. Here, the edges in G may be classified into equivalence classes $E_1, E_2, \ldots, E_n$ and an arbitrary pair of edges included in each of the equivalence classes exist on a common path which does not include both the vertices $\{a, b\}$ other than endpoints. The $E_i$ is named to be a separation class of G for the given $\{a, b\}$. When there are more than two separation classes and the conditions below is not satisfied, the pair $\{a, b\}$ defines as a separation pair of G;

1. whether there are just two separation classes and one of the separation classes is consisted of only one edge, and
2. whether there are just three separation classes and each of the separation classes is consisted of only one edge.

When G is biconnected and does not include any separation class therein, G is determined to be triconnected. For other case, $\{a, b\}$ becomes a separation pair of G. The separation classes of G for a given $\{a, b\}$ are defined to be $E_1, E_2, \ldots, E_n$. Here, E' and E" are defined such that $|E'| \geqq 2$ and $|E''| \geqq 2$, wherein E' and E" are defined as follows;

$$E' = \bigcup_{i=1}^{k} E_i \tag{1}$$

$$E'' = \bigcup_{i=k+1}^{n} E_i$$

In the formula (1), k, i, and n are positive integers. Now $G_1$ and $G_2$ are defined as follows;

$$G_1 = (V(E'), E' \cup \{(a, b)\}), \text{ and}$$

$$G_2 = (V(E''), E'' \cup \{(a, b)\}) \tag{2}$$

In the formula (2), G=(V, E) is defined as a graph consisting of a group of vertices V and a group of edges E. V(E) denotes a group of vertices including all of the end points of E. Here, $G_1$ and $G_2$ are named as split graphs of G for a given $\{a, b\}$. When the graph is split, new edges (a, b) and (a, b) are added each time per splitting. These edges are named as "virtual edges" and represented by (a, b, i) and the split operation is represented by s(a, b, i) such that i represents an identifier of the split operation.

A first stage of the triconnected component decomposition performs the split operation on the input graph and the split operations are repeated until the already split graphs cannot further split with consistency. The split graphs in the final state are named as "split components". The set of split components for the input graph is not unique.

The split graphs are categorized into the following three kinds;
(1) three bond graph having constructions such as ($\{a, b\}, \{(a, b), (a, b), (a, b)\}$),
(2) triangle graph having constructions such as ($\{a, b, c\}, \{(a, b), (a, b), (a, b)\}$), and
(3) triconnected graphs.

These graphs are shown in FIG. 2 as examples.

The second stage of the triconnected component decomposition combines the split components locally so as to obtain a set of triconnected components that is unique to the input graph. $G_1 = (V_1, E_1)$, and $G_2 = (V_2, E_2)$ are here split components both including the virtual edges (a, b, i). In this condition, when the formula is assumed;

$$G = (V_1 \cup V_2, (E_1 - \{(a, b, i)\}) \cup (E_2 - \{(a, b, i)\}))$$

wherein G is defined as "merge graph" between $G_1$ and $G_2$.

When starting from the set of the split components and applying the merge operation to the 3-bond components, several bond components may be derived. Similarly, when applying the merge operation to the combination of the triangle components as far as possible, several polygonal components may be derived. The above merge operations result in provision of groups each including three (3) kinds of components. Those three kinds of graphs are polygonal graphs, bond graphs, and triconnected graphs, respectively.

These three kinds of graphs are named as "triconnected components" of the input graph. The decomposition into the triconnected components is unique.

2. Component Graph

Figure 3:
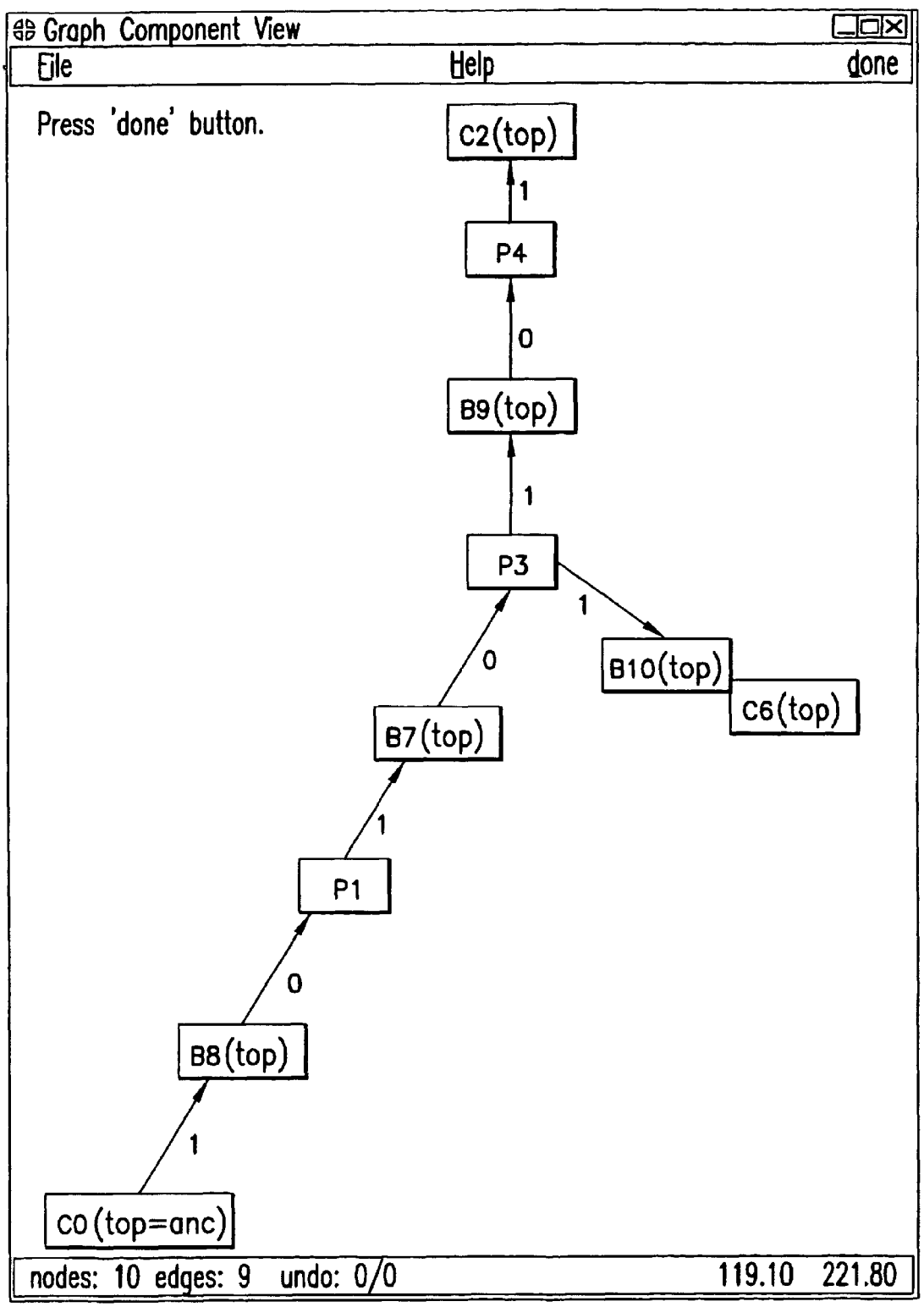
FIG. 3 shows a sample component graph after the triconnected component decomposition according to the present invention.

A new graph is defined such that the biconnected multi-graph is decomposed into triconnected components and then the triconnected components are regarded as nodes and a pair of virtual edges is regarded as arc connecting the triconnected components at both sides. The new graph is named as "component graph". A sample component graphs are shown in FIG. 3. The component graph always becomes a tree.

3. Enumerating of Embeddings for Each of the Triconnected Component

Here, embedding onto an orientable surface having genus of zero (0), hereafter denoted as "sphere" will be discussed for each type of the triconnected components prior to start discussions on a procedure of embedding of the general biconnected multi-graph. First, numbers of embedding onto the sphere for the n-bond graph correspond to numbers of circular permutation of edges of n ($\geq 3$), i.e., (n−1)!. The group of entire embedding includes (n−1)!/2 pairs which become mirror images each other. That is, there are embeddings of (n−1)!/2 kinds in the n-bond graph and there are, in turn, embeddings of (n−1)! when orientation of the sphere is changed through inversion operation thereof.

Next, there is only one embedding onto the sphere for the polygonal graph component. In this case, the mirror image of this embedding becomes identical thereto, and hence a different embedding is not generated even when the orientation of the curve is changed.

At last, the triconnected graph components may be embedded onto the sphere as described below;
(1) the input graph prior to the triconnected component decomposition is assumed to be a planar graph, and
(2) when the original graph is a planar graph, each graph generated by the triconnected component decomposition is planar.

When the orientation of the sphere in which the graph is embedded is inverted, another embedding in a mirror image thereof, which does not corresponds to the original embedding, is obtained.

Table I summarizes the numbers of embeddings for each of the triconnected component graphs. In FIG. 4, sample embeddings are described for each type of the graphs. In FIG. 4, T denotes the top side and B denotes the bottom side, respectively.

TABLE I

Numbers of embeddings for triconnected component graph

| Type of components | numbers of states | inversion of curved surface | numbers of embeddings |
|---|---|---|---|
| n-bond graph | (n − 1)!/2 | possible | (n − 1)! |
| Polygonal graph | 1 | N/A | 1 |
| triconnected graph | 1 | possible | 2 |

4. Generation of Embeddings for Biconnected Graph

Figure 5:
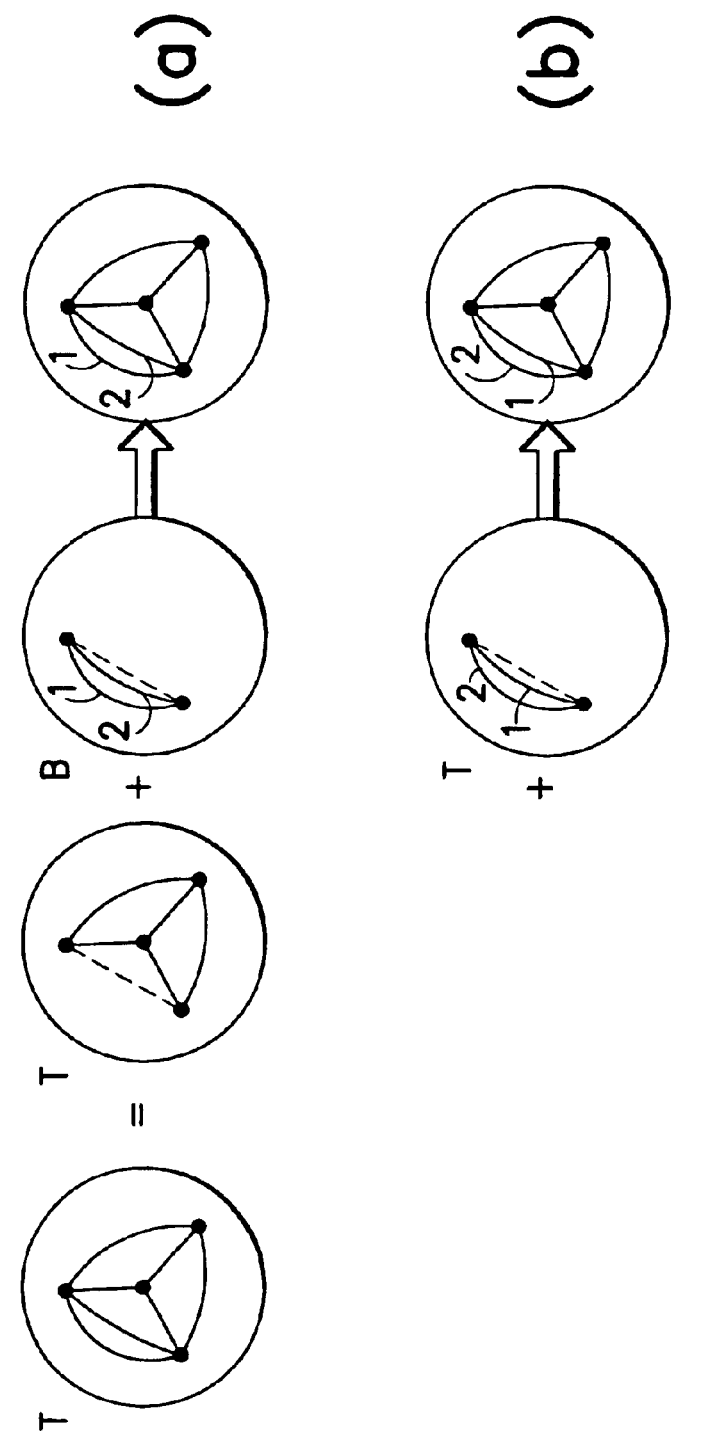
FIG. 5 shows a biconnected graph which is assumed to consist of two (2) graph components according to the present invention.

The biconnected multi-graphs may be decomposed into a set of triconnected components uniquely based on the discussion of the preceding paragraph. In this paragraph, a method for generating all of the embeddings for the biconnected multi-graph will be discussed. FIG. 5 shows a biconnected graph which is assumed to consist of two (2) graph components. One of the components is triconnected graph and the other a 3-bond graph. In FIG. 5, T denotes the top side and B denotes the bottom side, respectively. Each of the graph components includes two (2) embeddings when the inversion is considered as shown (a) and (b). To generate embedding of the entire graph onto the sphere, the corresponding virtual edges are merged to each other. This operation corresponds to the inversion operation of the split operation. In the sample shown in FIG. 5, the embedding is achieved by two (2) ways.

Generation of embeddings for general biconnected multi-graphs is then summarized as follows;
1. Decompose the input graph into triconnected components. Let the number of n-bond, polygon, and triconnected component be $N_B(n)$, $N_P$, $N_T$, respectively.
2. As an initial embedding, generate a planar embedding for each component.
3. If there is only polygon component in the component graph, the number of components should be one. Therefore, there is one trivial embedding for the graph and the algorithm terminates.
4. Otherwise, pick up one node from either bond graph component or triconnected graph component from the component graph as a root node. Now all nodes in the component graph except the root node has one parent node because the graph is a tree.
5. Label all arcs whose descendant node is a polygon component as a "dead" arc. There are $N_p$ dead arcs and $$M_{nd} = \sum_{i=3} N_B(i) + N_T - 1$$

non dead arcs. Set up the same number of variables that can take two values as +1 and −1.
6. An n-bond ($n \geq 4$) graph component has multiple states apart from orientation difference. Set up $$\sum_{i=4} N_B(i)$$

variables. Each variable is supposed to take $$\frac{(n-1)!}{2}$$

discrete states depending on the bond size n.
7. For every possible combination of values of a set of $$\left(M_{nd} + \sum_{i=4} N_B(i)\right)$$

variables, do the following procedure;
8. For each n-bond ($n \geq 4$) component, generate an embedding that corresponds to the variable's value by permutation. Let it be a reference embedding for this component.
9. For each component node, count up the number of (−1)'s on the path between the root node and itself. When there are m (−1)'s, assign the sign of $(-1)^m$ to the node. The sign of the root node is always +1 to avoid generating duplicate embeddings when they are reversed.
10. For each component node, reverse the reference embedding if the corresponding variable is −1. Otherwise, use the reference embedding. Inverting edge ordering at each vertex in the graph can mirror an embedding.
11. Merge all the spheres sequentially by gluing pairs of virtual edges. After all merging process, there are no virtual edges in the embedded graph.

By using the above algorithm, all possible embeddings are generated. The total number of embeddings $N_{em}$, can be written as follows;

$$N_{em} = 2^{N_T-1} \cdot \prod_{i=3}^{\infty} \{(i-1)!\}^{N_B(i)}$$

5. Geometrical Selection and Ranking of the Embeddings 5-1 Criterion of Shape; "Simplicity"

As described above, when the input wire-frame, i.e., input graph is not a triconnected graph, there is a plurality of embeddings to be candidates. The candidates are topologically equivalent. However, the present invention selects and rank the candidates of solutions based on the principle that the interpretations, i.e., embeddings with simpler shapes have higher priority when considering that the domain of the object subjected to the method according to the present invention such as, for example, a solid structure physically realized. In order to select and rank, several criteria may be used in the present invention. The criteria used in the present invention will be discussed herein bellow. An evaluation criteria of simple shape depends on the category of the solid structure subjected, however are generally common among the solid structure, and therefore the present invention utilizes a set of criteria described below; the sets of the criteria are classified into two (2) categories depending on the object for evaluation; one relates to single face loop and the other relates to combination of face loops.

5-2 Criteria for a Single Face Loop

To reconstruct a simple shape constructed as a group of face loop, it is preferred that the face loops included in the group are simple. The evaluation of the single face loop is effective to exclude geometrically inadequate face loops and the rest of the face loops are used to rank in accordance with simplicity thereof. However, only the information of the boundary curves is input in the present invention and curved surfaces inside the boundary curves are not input. Then the method according to the present invention put the curved surface inside the boundary. The method according to the present invention utilizes the criterion for a single face loop. The characteristics used in those criteria include kinds of surfaces, areas of surfaces and variations and variation rates of normal vectors of the surface.

<Kinds of Curved Surface>

Figure 6:
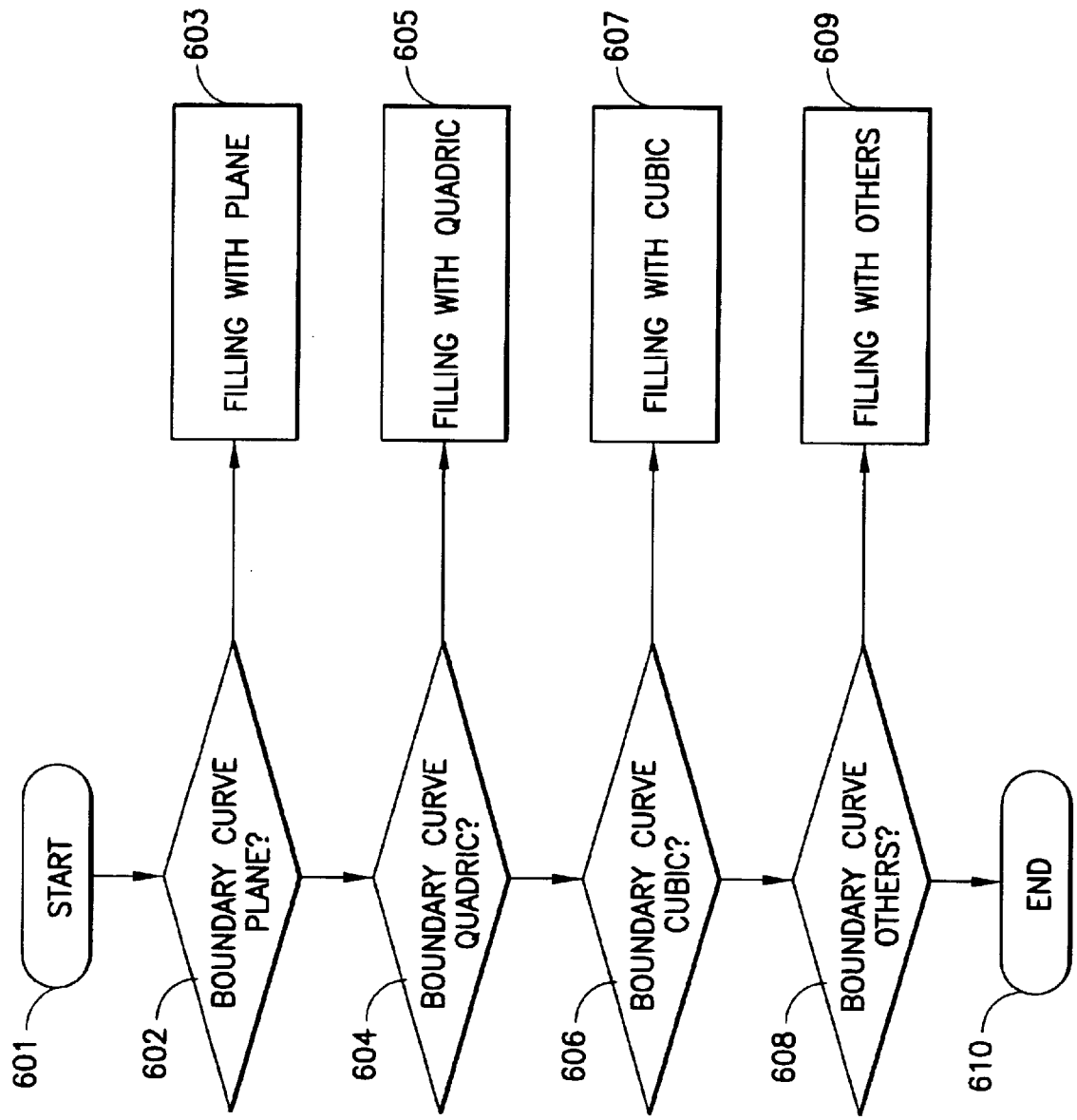
FIG. 6 shows a flow chart for executing the selection of the surface according to the present invention.

The method according to the present invention selects simple surfaces when the boundary curves of the face loop are filled with a specific kind of the surfaces. In the present invention, various selection criteria for the specific kind of the surfaces may be possible. For example, the criterion that a plane is the simplest; a quadric surface is the second simplest and a cubic surface is the third simplest may be sometimes useful. FIG. 6 shows a flow chart for executing the selection of the surface. The selection method according to the present invention starts from the step 601 and the method first determines whether or not the boundary curve extends along with a plane in the step 602. If so (yes), the method determines the boundary curve is on a plane in the step 603. If not (no), the method proceeds to the step 604 and the method determines whether or not the boundary curve is filled with a quadric surface. If so (yes), the method determines the boundary curve is filled with the quadric surface in the step 605. If not (no), the method further proceeds to the step 606 and determines whether the boundary curve is filled with a cubic surface. If so (yes), the method determines the boundary curve is filled with the cubic surface in the step 607 and if not (no), the method further proceeds to the step 608 and tries to fill the boundary curve with further higher order surfaces or the surface having the smallest area in the step 609 and end at the step 610. There may be many practical methods to find the surfaces suitable to the given boundary curve. The present invention may adopt any other procedure to determine the surfaces suitable to the boundary curves. The above process provides various advantages as described below;

(1) The surfaces are determined to each of the face loop, and then other geometrical evaluation is made easy, accordingly.

(2) The ranking of the face loop according to the simplicity may be performed straightforward depending on the kinds of surfaces.

(3) Face loops which are not filled with acceptable surfaces may be omitted from the consideration by preliminarily limiting the kinds of surfaces.

When the object solid is a machine part etc., it may be effective to provide priorities to a cylindrical surface, a conical surface, or a spherical surface among quadric surfaces. In addition, torus, which is not categorized in quadric surfaces, may be prioritized equally as quadric surfaces to fill the boundary curve.

<Area>

The value of area of the surface filled in the face loop may be calculated exactly or approximately. The area may not be used to exclude inconsistent face loops from the reconstruction only by the characteristic of area, however it is considered that the shape reconstructed by one set of the face loops becomes simple as a whole as the total of the surface area becomes small. In the method according to the present invention, the surface area is used as one of the criteria for selecting and ranking the set of embeddings as described above.

Figure 7:
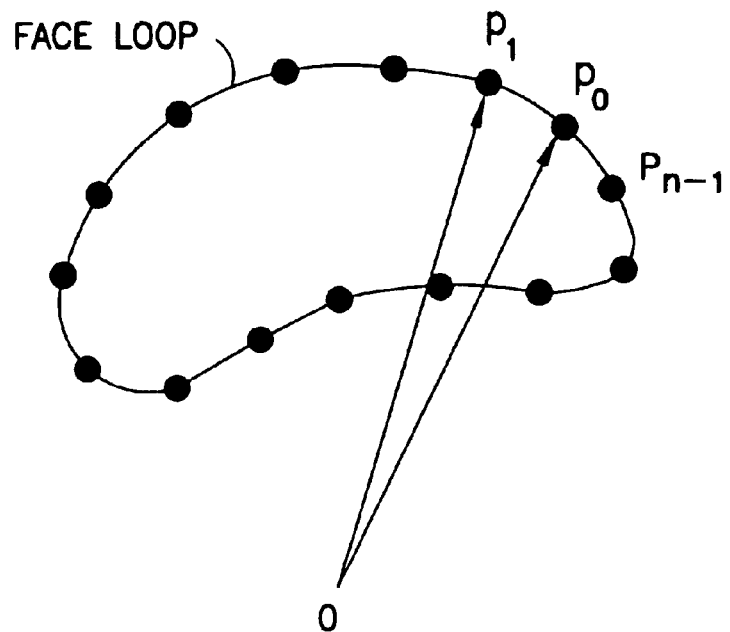
FIG. 7 shows an embodiment of the method for computing the area of the face loop.

The area of a given face loop may be computed using several known methods. FIG. 7 shows an example of the method for computing the area of the face loop. When using coordinates of the points on the loop to obtain position vectors $p_0, p_1, \ldots, p_{n-1}$ from a predetermined common point O are defined and then the approximated area S is given by the following formula;

$$S = \frac{1}{2} \left| \sum_{i=0}^{n-1} (p_i \times p_{i+1}) \right|$$

wherein "X" represents an outer product of vector and $p_n = p_0$. The above method is only explained as an example for computing the area, and any other computing method may be used in the present invention.

<Range and Rate of Variations of Normal Vectors>

The criteria used in the present invention may include ranges and rates of variations of normal vectors for all points on the surface. The procedure providing this criterion is summarized as follows;

A Gaussian map of the normal vectors for all points on the surface is constructed first and then a cone which circumscribes the normal vectors in the Gaussian map is formed. Then the range and the rate of variation of the normal vectors are examined using a vertical angle of the cone. The derived angle may be used to determine the variation of the normal vectors. When the vertical angle becomes smaller and smaller, the surface inside the boundary curve closes to a simple plane. On the other hand, the variation rate of the normal vectors of the surface corresponds to a curvature of the surface, and hence sudden variation rates represent the local curved portion of the surface. It is possible to provide a predetermined threshold to the variation range and variation rates such that the surface having curvatures larger than a predetermined threshold may be excluded in the computation thereafter or may be lowered the priority thereof in the reconstruction.

5-3 Criteria for Combination of Face Loops

The present invention may utilize another criterion derived from combinations of the face loops for reconstruction of the shape. The characteristics derived from the combination of the face loops used in the present invention are explained as follows:

<Interference of Surfaces>

Figure 8:
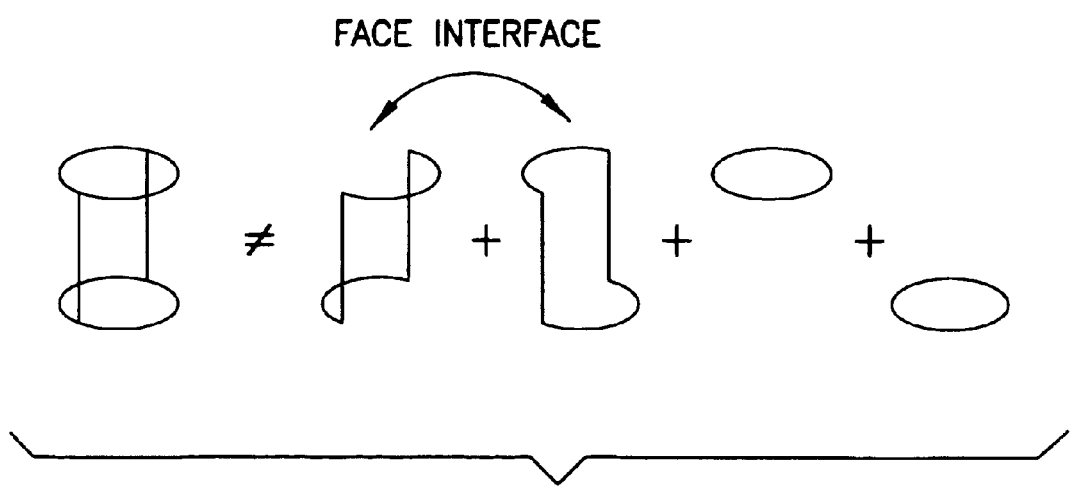
FIG. 8 shows an embodiment of the embedding which is excluded by the criterion of expansion and contraction of the surface according to the present invention.

When the surfaces filled in the boundary curves interfere each other at other positions of the boundary curve after filling thereof with the surfaces, the combination of the surfaces should be excluded in exact embeddings of the wire-frame. A sample of interference of the surfaces is shown in FIG. 8. Therefore, it is necessary to exclude the embeddings including the interfered surfaces each other in the present invention. This characteristic is effective to exclude inconsistencies of the embeddings rather than evaluation of the simplicity.

<Contact of the Surfaces Between Edges>

The method according to the present invention uses an angle θ between normal vectors for two surfaces adjacent each other at the boundary thereof as a characteristic for the contact of edges. When the adjacent surfaces contact perfectly smooth, the angle θ of the normal vectors at the boundary is zero (0) and an extremely steep contact between the adjacent surface provides the angle θ of π radian.

In most cases, it may be effective to set a predetermined threshold to be $5\pi/6$ for the contact angle θ in order to exclude extremely sharp ridges. The threshold for the angle θ may be different value other than $5\pi/6$ as far as the sharp edges may be excluded properly. Also according to the present invention, it may be possible to lower the priority of the embeddings including the edge having the value exceeding a predetermined angle in terms of simplicity.

<Expansion and Contraction of Surfaces>

In the present invention, the term "expansion and contraction of surface" means how the surface extends around a vertex. The characteristic of expansion and contraction of the surface is supposed that the object is formed with a planar material such as, for example, a sheet metal, and is generally effective to exclude overlapped surfaces. FIG. 9 shows an embodiment of the embedding which is excluded in the criterion of expansion and contraction of the surface. In FIG. 9, the arrows indicate substantial portions of the surface connected to the vertex V. FIG. 9(a) shows the embodiment in which overlapping does not occur and FIG. 9(b) shows the embodiment in which overlapping occurs around the vertex V. The sum Σ of the angle indicated by the arrows become $2\pi$ in FIG. 9(a) and the sum Σ of the angle indicated by the arrows becomes $8\pi/3$ in FIG. 9(b) because the arrows are partially overlapped each other in FIG. 9(b). Therefore, FIG. 9(b) indicates that the surfaces extends and overlaps each other with respect to the embodiment shown in FIG. 9(a) and the surfaces overlap around the vertex V. The characteristics is effective to exclude, for example, the embodiment shown in FIG. 9(b) in which the surfaces largely extend to other surface to cause overlap by adopting the upper threshold to be $5\pi/2$. The upper threshold may be, of course, different from the value $5\pi/2$ in the present invention. Alternatively, it may be possible to exclude the embeddings having the sum greater than the least value beyond a given ratio in the present invention.

The characteristic of extension and contraction is effective in the case that there is a plurality of edge ordering around a particular vertex except for inversion. When there are only one theoretical ordering for the edges, this criterion is not effective, and this characteristic should be applied when the following conditions are satisfied;

(1) the vertex adjacent to n-bond graph (n≧4), and (2) the vertex which is adjacent to two (2) or more of the triconnected graph components or bond-graph components.

6. Selection and Ranking the Embeddings Based on the Criteria

FIG. 10 shows a sample pseudo code for selecting and ranking the embeddings based on the criteria. The process for selecting and ranking the embeddings first make Queue empty. Then the process executes the following steps for each of all embeddings.

First the process sets Score=0. Then the process evaluates all the loops in the embedding by computing a value for each loop. If the loop is acceptable, the computed value is accumulated to Score, and if not (unacceptable) the process skips all the remaining evaluations for the embedding because the embedding itself is regarded as improper, then starts evaluation of the next embedding.

If all the loops in the embedding are acceptable, then the process evaluates combinations of loops around all the vertices in the embedding by computing a value for each vertex. If the combination around a vertex is acceptable, the computed value is accumulated to Score, and if not (unacceptable) the process skips all the remaining evaluations for the embedding because the embedding itself is regarded as improper, then starts evaluation of the next embedding.

If all the vertexes in the embedding are acceptable, then the process evaluates all the edges, (i.e., pairs of adjacent loops) in the embedding by computing a value for each edge. If the edge is acceptable, the computed value is accumulated to Score, and if not (unacceptable) the process skips all the remaining evaluations for the embedding because the embedding itself is regarded as improper, then starts evaluation of the next embedding.

If all the above evaluations for the embedding are acceptable, the process register in Queue the pair consisting of the embedding and Score. Then the process proceeds to the next embedding to repeat the above procedure. This accumulation procedure is repeated until evaluation of all of the embeddings is finished. Then the procedure sorts the Queue containing acceptable embeddings according to the values of Score.

In the present invention, many possible embeddings may be obtained, however as described above, most of the embeddings are discarded by the evaluation procedure and therefore, the present invention may significantly improve computation efficiency. In addition, the embeddings remained by the evaluation are ensured to be acceptable face loops, and hence the present invention may significantly improve accuracy of the reconstruction from the wire-frame together with reduction of the computation time.

7. Open Shell Structure

As described above, the method according to the present invention is effective to reconstruct the three-dimensional shapes which are homeomorphic to the as a whole. However, the present method may be easily applied to a set of faces which is homeomorphic to a disc. The term "homeomorphic to a disc" means the shape such as a sheet metal part which is often used practically. A sheet metal part theoretically corresponds to a shape which is generated by subtracting one face loop from a set of face loops included in an embedding onto the sphere.

Therefore, it is easy to generate face loops which are homeomorphic to a disc according to the present invention. The total number of the embeddings $N_{disc}$ onto a disc is computed using $N_{em}$ which is the number of the embeddings onto the sphere as follows;

$$N_{disc} = c \cdot N_{em}$$

wherein c denotes a number of loops per embedding and is constant in all embeddings onto the sphere.

When there is no inside hole, i.e., only a two-dimensional region which is homeomorphic to a disc is taken into account, the evaluation based on the geometrical information is performed using "c" embeddings derived from the embedding onto the sphere as follows;

(1) Evaluate each of the face loops included in the embeddings onto the sphere. The same face loop appears repeatedly in different embeddings, and hence the results for face loops already evaluated are used again.

(2) If there is no inconsistent face loop as the result of the evaluation, the following three steps, i.e., step (3)–(5), are executed for each of "c" different embeddings. If there is only 1 inconsistent face loop, the steps are applied to the embedding from which the inconsistent face loop is removed. If there are two or more inconsistent face loops, the "c" embeddings derived from the embedding onto the sphere are not acceptable and the procedure terminates here.

(3) The sum of scores of the face loops are calculated.

(4) Evaluate the combination of the face loops included in the embeddings. Since the evaluation is carried out locally, and hence the efficiency will be improved by using the results obtained already. Note that combinations including the removed face loop should not be considered.

(5) If there is any inconsistent combination, the evaluation for the embedding terminates since the embedding is not acceptable. If the embedding is acceptable, the computed scores are accumulated for the given embedding. The above procedure is repeated to all of the embeddings onto the sphere, and a set of embeddings with high scores is given as the output.

When embeddings with smaller area are preferred because of their simplicity, it is generally true to select out of "c" embeddings the one in which the largest face loop is discarded. For example, when the entire geometry of the wire-frame is on a plane, the largest face loop has an area equal to the sum of areas of the other face loops, and therefore the largest face loop area occupies a half of the total area. Conversely, a combination, i.e., an embedding excluding a smaller face loop makes a larger area as a whole, and therefore it can be discarded early.

There may be many criteria to determine whether one of the face loops should be removed to construct an open shell structure. Based on the assumption that the largest face loop may often be adequate to be removed, the following condition may be useful to determine whether there is a face loop to be removed:

$$\frac{S_{max}}{\sum_i S_i} > 0.30 \text{ and } \frac{S_{next}}{S_{max}} < 0.5$$

where $S_{max}$ and $S_{next}$ are the surface area of the largest face loop and the surface area of the second largest surface area, respectively. $S_i$ is an area of each face loop.

The method according to the present invention may be implemented in any computer system including for example, a personal computer with a central processing unit (CPU) such as Pentium (Intel, Trademark) or other compatible CPUs or a workstation in which an operating systems such as Windows (Microsoft Corporation, Trade Mark), Windows NT (Microsoft Corporation, Trade Mark), OS/2 (International Business Machines Corporation), UNIX, or Linux may run. The system according to the present invention may be useful in various technical fields in which reconstruction of the surface geometry is requested and may particularly useful in a system for computer aided design, i.e., CAD system.

The method according to the present invention may be executed by a program product written in any suitable programming language such as object-oriented C language, and such the program product may be stored in any computer readable storage media such as a floppy disk, an optical disk, a hard disk, a CD-ROM, and a magnetic optical disk etc.

Hereunder, the present invention will be explained using specific embodiments depicted as drawings, however the embodiments hereunder are provided for understanding the present invention rather than for limiting the present invention.

EXAMPLES

Example 1

Triconnected Component Decomposition

Figure 11:
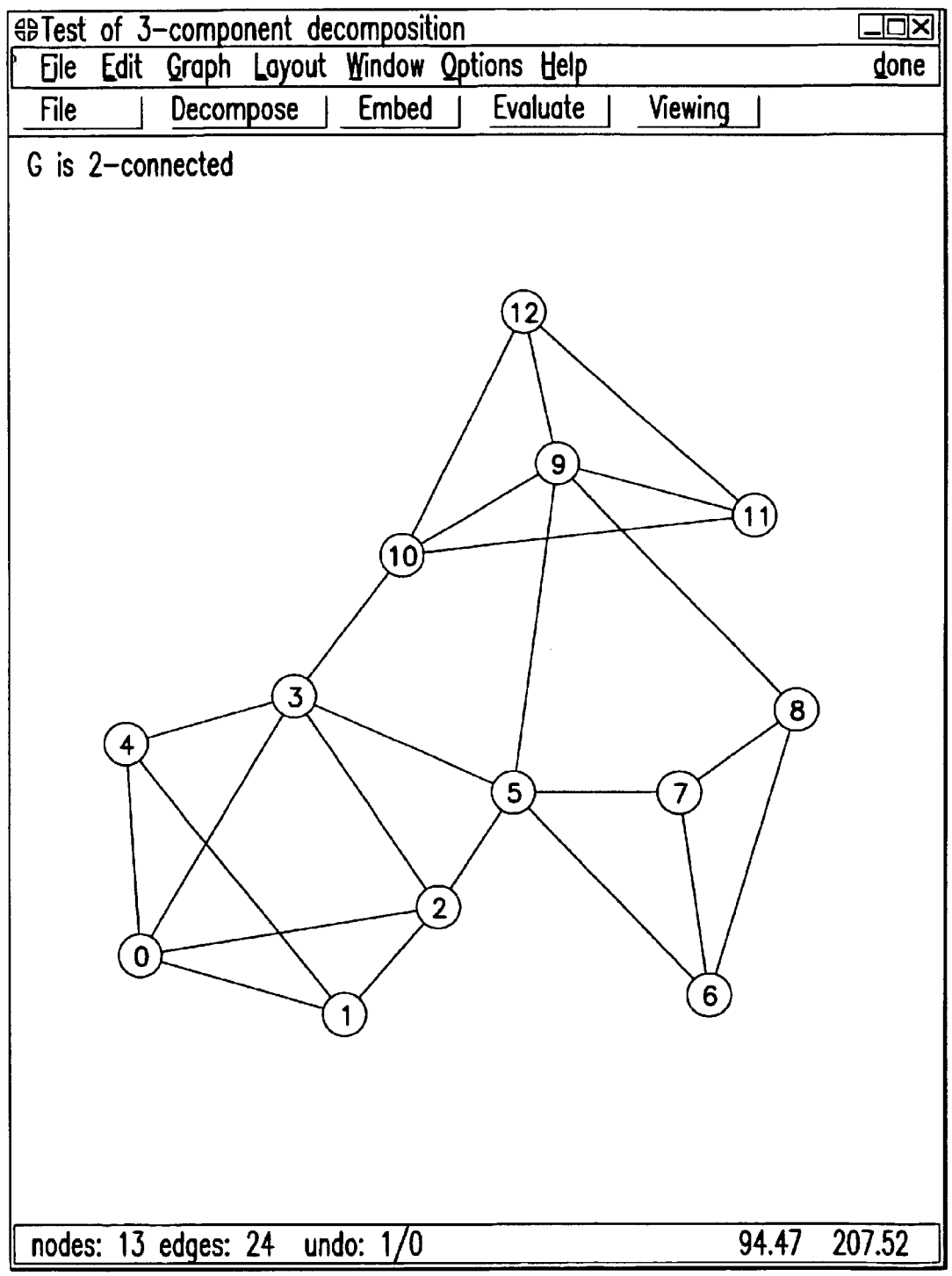
FIG. 11 shows an embodiment of as input-wire frame of biconnected graph and the input wire-frame is generated using a CAD system.
Figure 12:
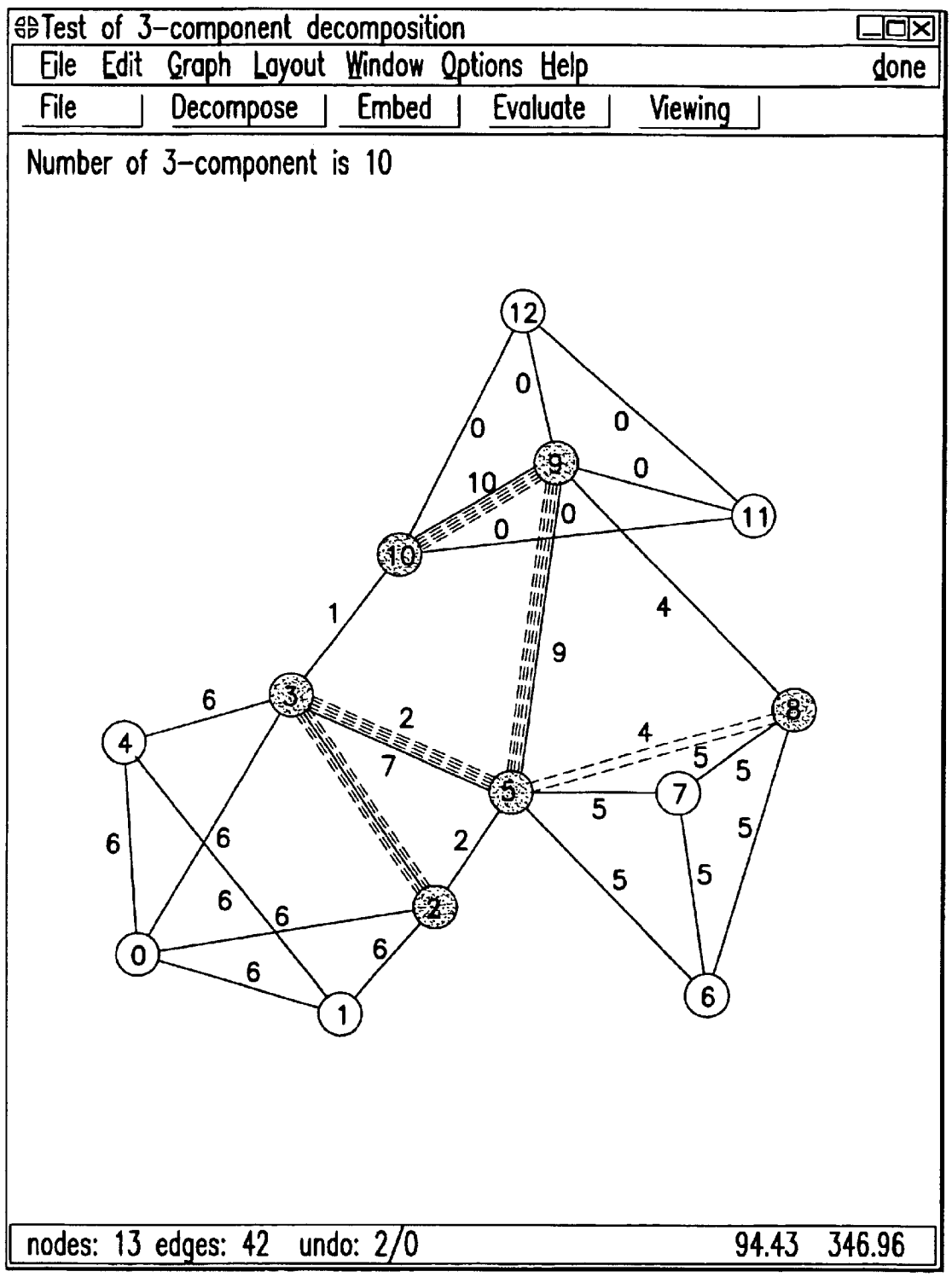
FIG. 12 shows the derived triconnected components and the virtual edges shown as broken lines.
Figure 13:
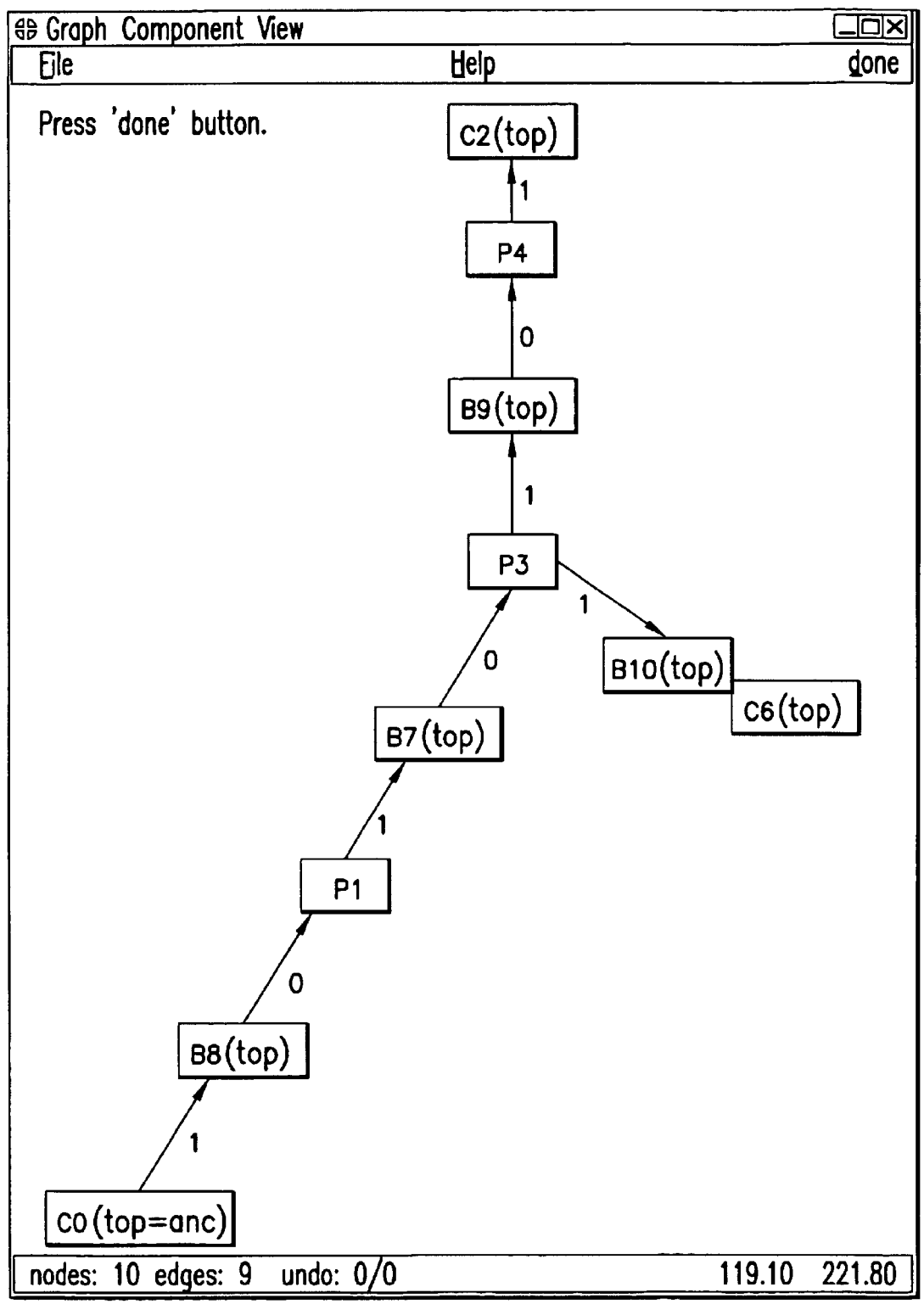
FIG. 13 shows an embodiment of the component graph. The triconnected components are represented by nodes and the relation of connected components by a pair of the virtual edges are represented by arc.
Figure 14:
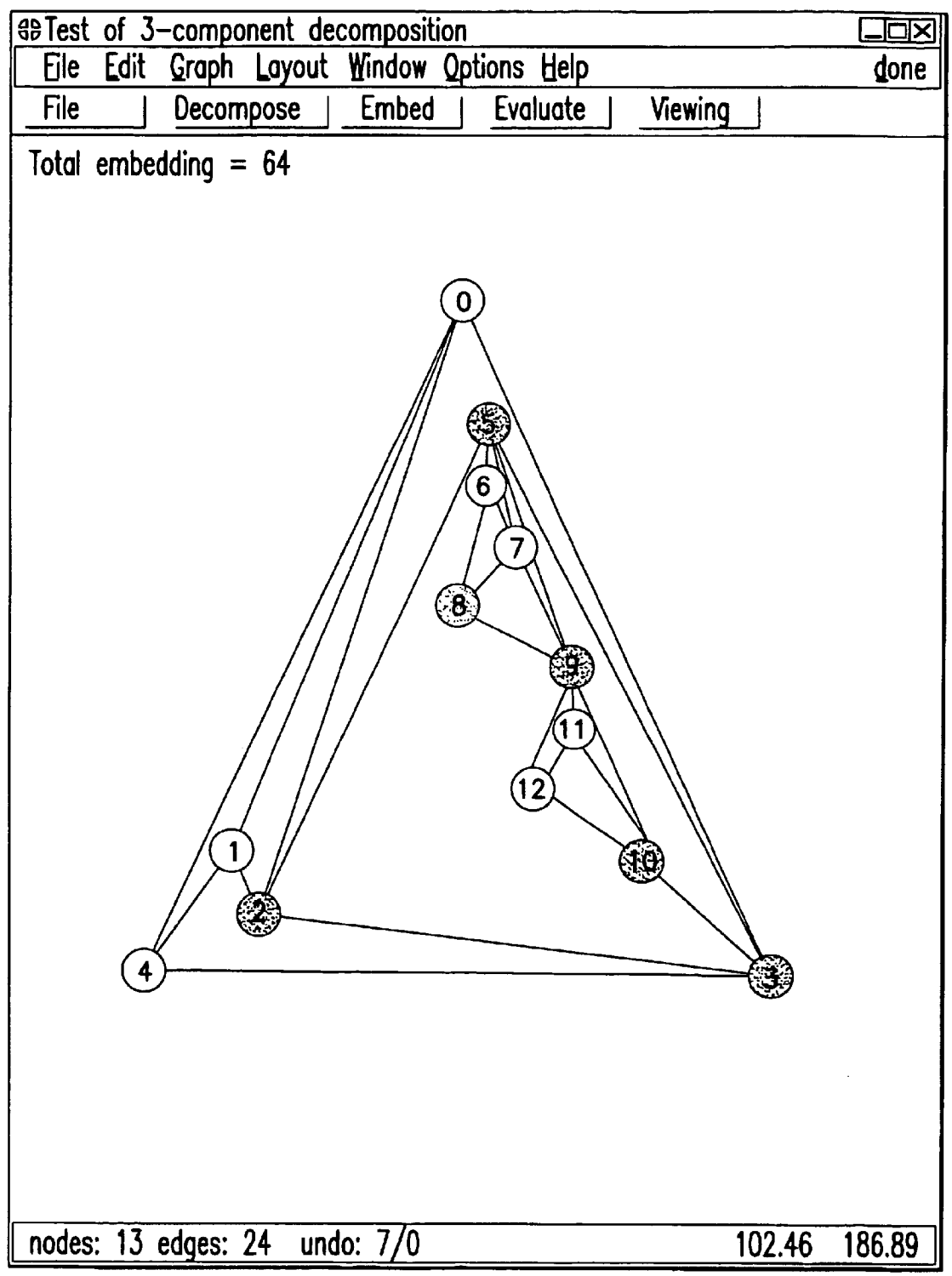
FIG. 14 shows one of the embeddings shown by projecting onto a plane according to the present invention.

A biconnected graph is shown in FIG. 11. The input graph of FIG. 11 was subjected to the triconnected component decomposition detailed hereinbefore to obtain triconnected components according to the present invention. The result is shown in FIG. 12. Virtual edges are shown as broken lines in FIG. 12. FIG. 13 shows the example of the component graph derived from the triconnected component decomposition. In FIG. 13, the triconnected components are represented as nodes, and the relations of the components connected by a pair of the virtual edges are represented as arcs. In the embodiment shown in FIG. 11 to FIG. 13, the total number of the embeddings are 64 when counted based on the component graphs shown in FIG. 13. FIG. 14 shows one of the embeddings drawn in the plane.

Example 2

Embedding onto the Sphere

Figure 15:
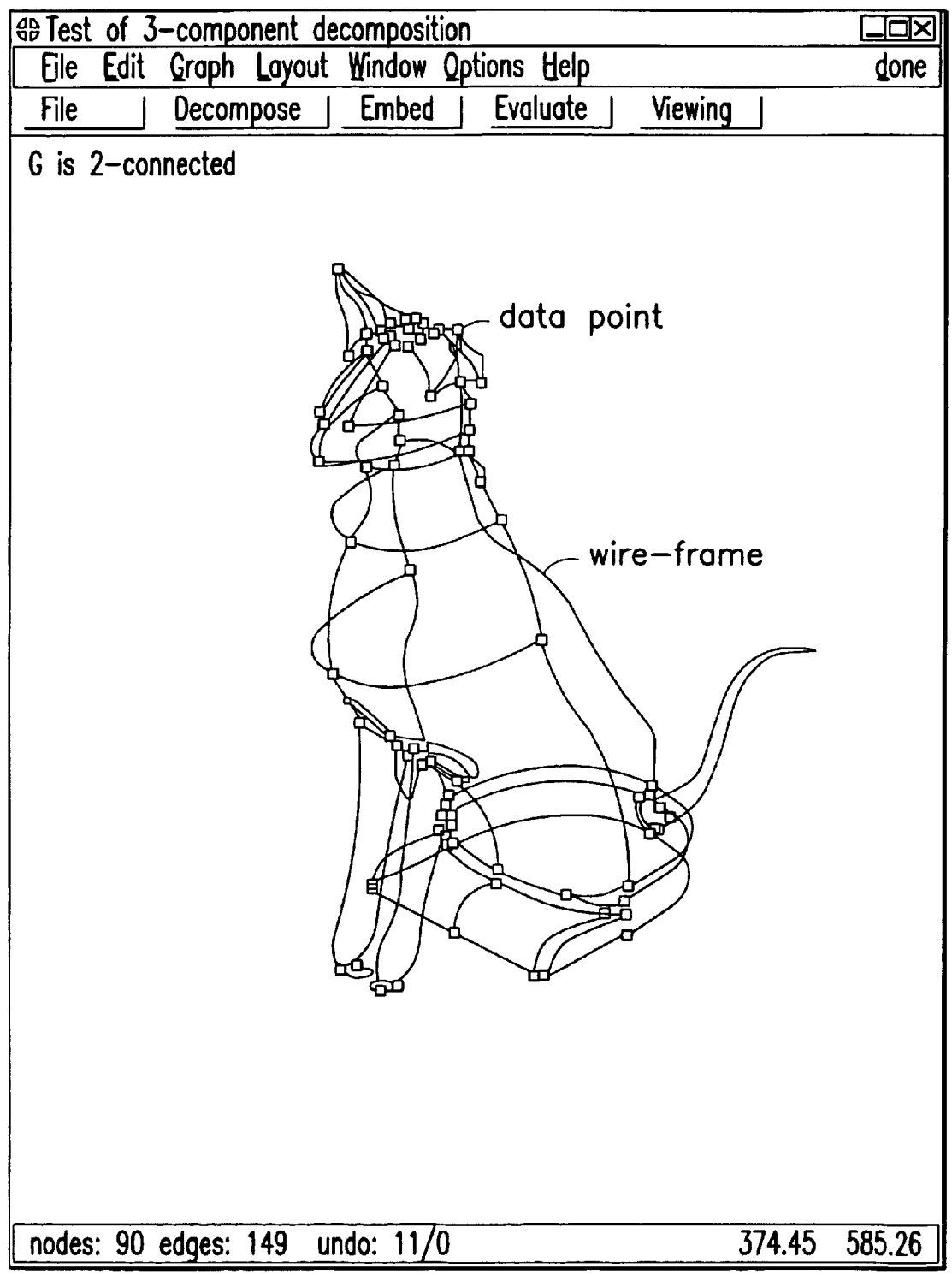
FIG. 15 shows the embedding procedure of the wire-frame according to the present invention.
Figure 16:
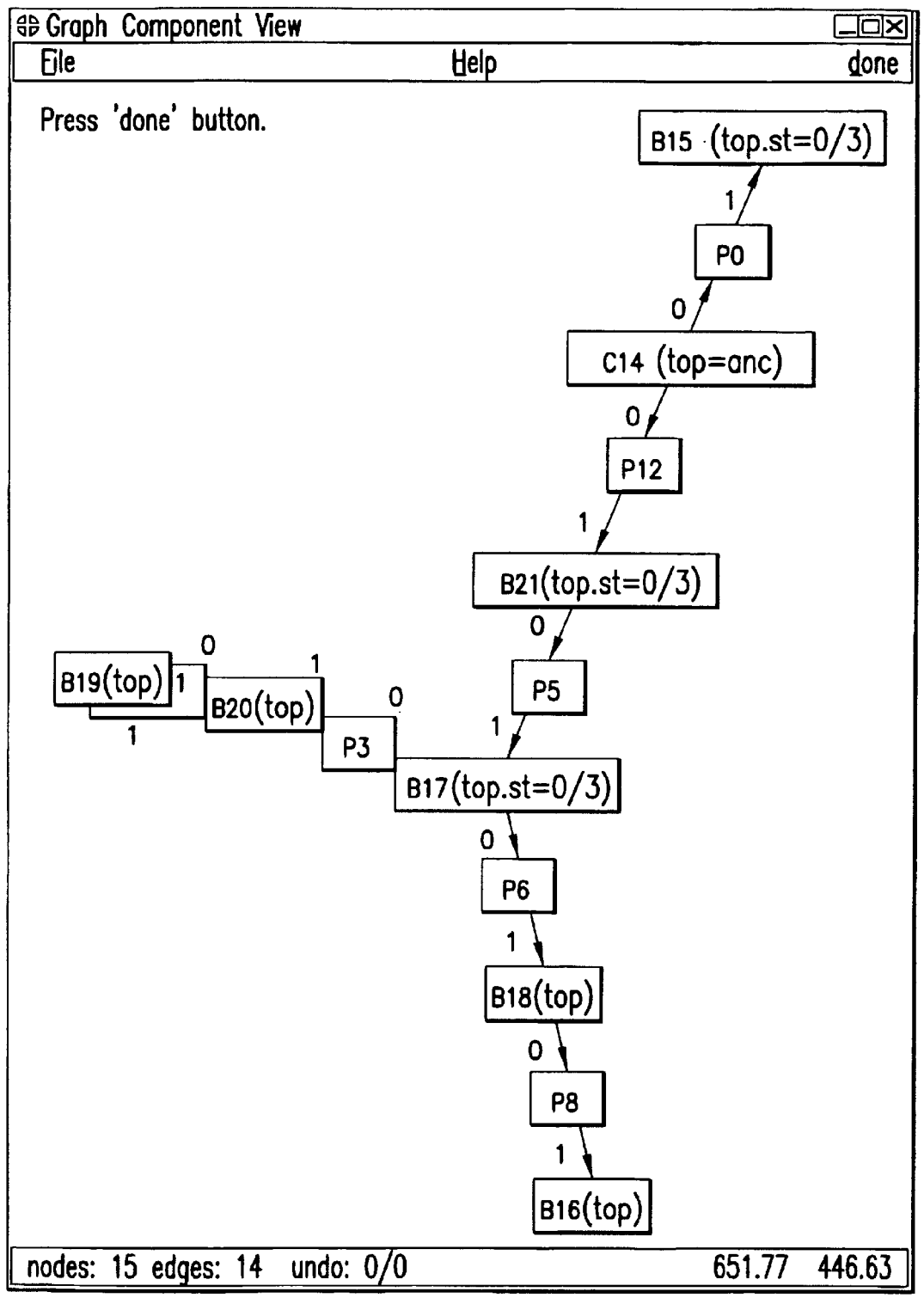
FIG. 16 shows a component graph corresponding to the embedding of FIG. 15.

In this example, the embedding procedure of the wire-frame is explained using the input wire-frame shown in FIG. 15. The input wire-frame was generated by a CAD system. The corresponding component graph is shown in FIG. 16. Table II shows characteristics of the wire-frame of FIG. 15 as the results of embedding onto a sphere.

TABLE II

| Characteristics of the wire-frame | |
|---|---|
| number of embeddings | 3456 |
| face loops per embedding | 61 |
| total number of face loops | 110 |
| number of face loops appearing in all the embeddings | 49 |

Figure 17:
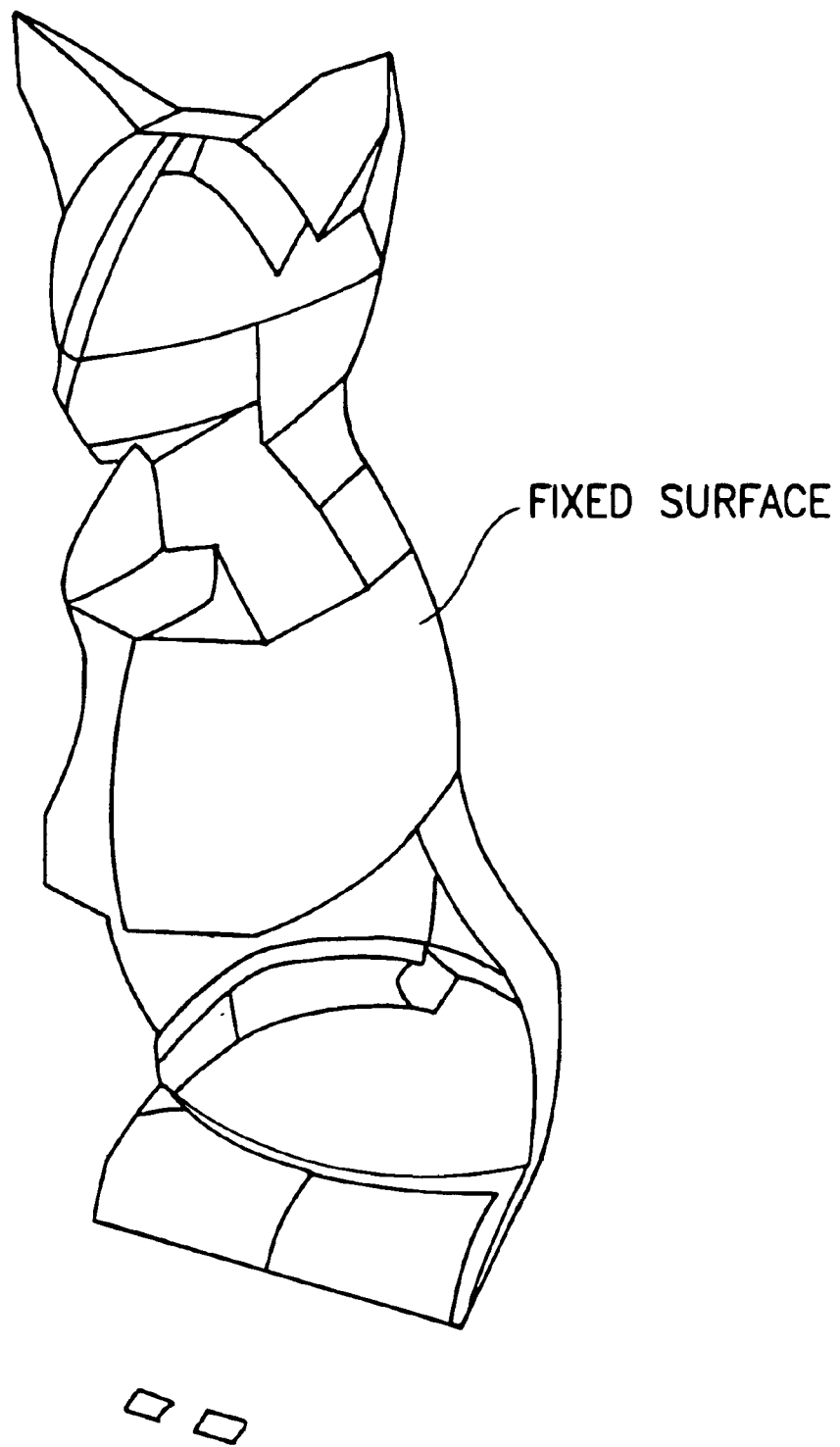
FIG. 17 shows the fixed 49 face loops obtained for the embeddings according to the present invention.

Although the geometrical evaluation is not carried out at this stage at all, it was found that 49 face loops in the total 61 face loops are included in all of the embeddings, and hence it was concluded that these face loops have been reasonably fixed. FIG. 17 shows the fixed 49 face loops listed in Table II.

Example 3

Evaluation Procedure

In this example, the criterion of the expansion and contraction of the surface was applied to the vertices having a plurality of edge orderings to examine the overlap of the surface in Example 2. 6 vertices have a plurality of edge orderings and 4 edges are connected to each of the 6 vertices. Since the ordering of the edges may occur in a circular permutation without considering the top and bottom, there are orderings of $$\frac{(n-1)!}{2}$$

at most for the vertex with n edges connected thereto. For each of the permutations, r (sum of inner angle/2) was computed. The determination of acceptance of the ordering was made using the inequality as follows;

$$\frac{r}{r_{min}} > 1.1$$

wherein $r_{min}$ denotes the smallest value for the orderings of all the possible edges relating to the vertex. The embeddings having such inconsistent orderings were discarded from the consideration. Table III shows ratios of the discarded embeddings over the 3456 embeddings. In Table III, the inconsistent r values are listed in the parentheses in the right column.

TABLE III

Ratio of Discarded embeddings

| vertex | degree | sum of inner angle/2π (ordering of edges) (1,2,3,4) | (1,2,4,3) | (1,3,2,4) | ratio of discarded embeddings (%) |
|---|---|---|---|---|---|
| (−672.9, 0.0, 13.2) | 4 | [1.417] | [1.417] | 0.998 | 66.7 |
| (−371.7, −0.0, 211.3) | 4 | [1.091] | [1.091] | 0.934 | 66.7 |
| (−673.1, −0.0, 42.4) | 4 | [1.417] | [1.417] | 0.998 | 66.7 |
| (−402.2, −0.0, 182.7) | 4 | [0.914] | 0.782 | [0.915] | 66.7 |
| (−412.1, 0.0, 181.6) | 4 | [1.270] | 0.999 | [1.270] | 66.7 |
| (−364.7, 0.0, 225.4) | 4 | [1.185] | [1.1851] | 1.000 | 66.7 |

The above 3456 embeddings was categorized with numbers of the inconsistent vertices based on the above criterion. The results are listed in Table IV.

TABLE IV

Analysis of inconsistent vertices

| number of inconsistent vertices | number of embeddings |
|---|---|
| 0 | 128 |
| 1 | 0 |
| 2 | 768 |
| 3 | 0 |
| 4 | 1,536 |
| 5 | 0 |
| 6 | 1,024 |
| total | 3,456 |

As shown in Table IV, it was found that only 128 embeddings do not include the inconsistent vertices out of 3456 embeddings.

Figure 18:
FIG. 18 shows the embeddings having the smallest surface area according to the present invention.

Surface area of the 128 embeddings were calculated by summing the areas of face loops and the 128 embeddings were sorted based on the surface areas. The embeddings having the smallest surface area is shown in FIG. 18. Although the areas were approximated values, the embeddings shown in FIG. 18 represent the desired embedding. Computation time required for the entire processing described above was about 1 second for the triconnected component decomposition and about 7 seconds for generation and evaluation of the entire embeddings by a personal computer implemented a CPU of Pentium-II (Intel, Trade Mark) with the clock rate of 400 MHz.

Example 4

Computation of Open Shell

Figure 19:
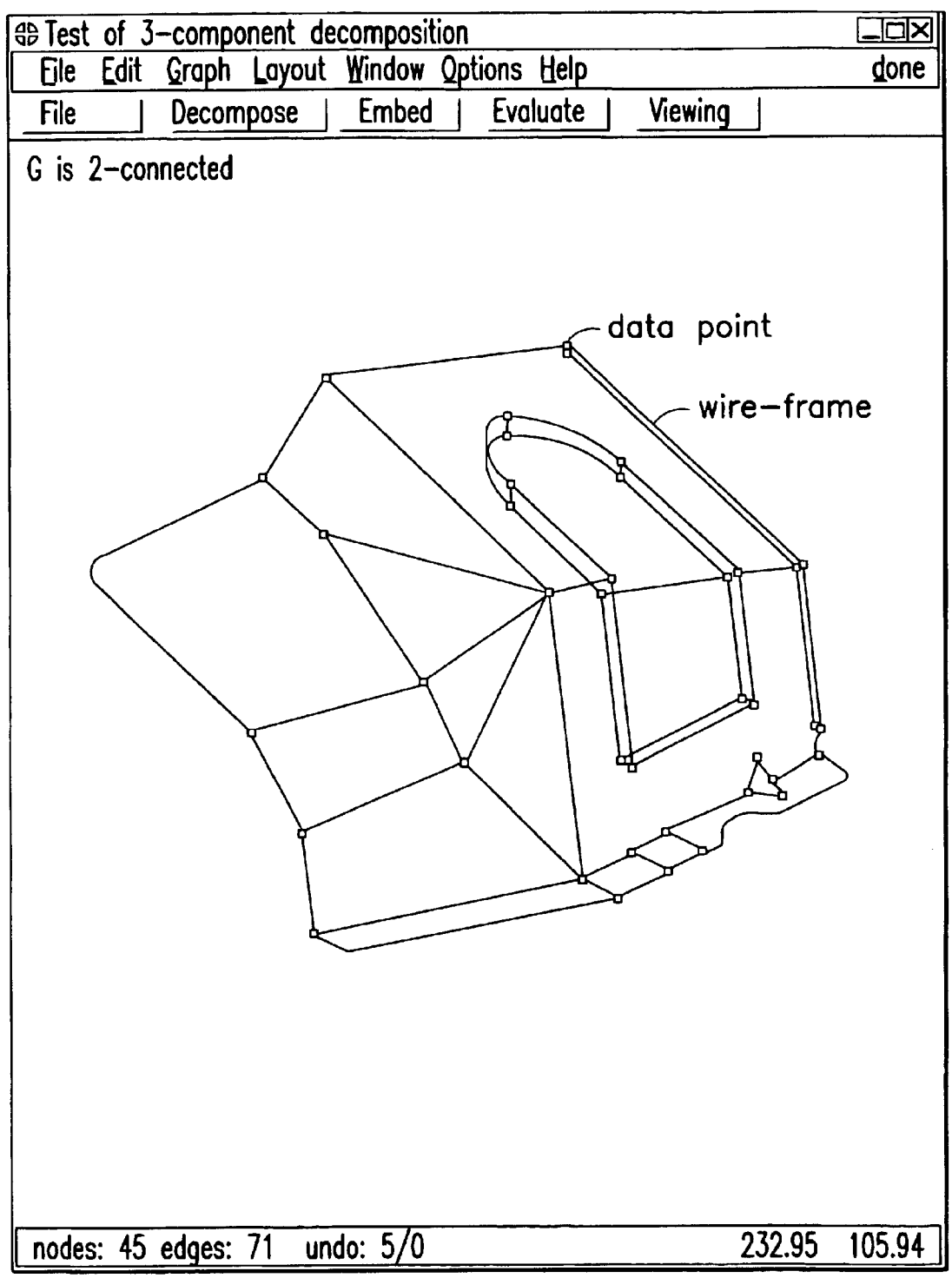
FIG. 19 shows an embodiment of another the input wire-frame which is generated by a CAD system according to the present invention.
Figure 20:
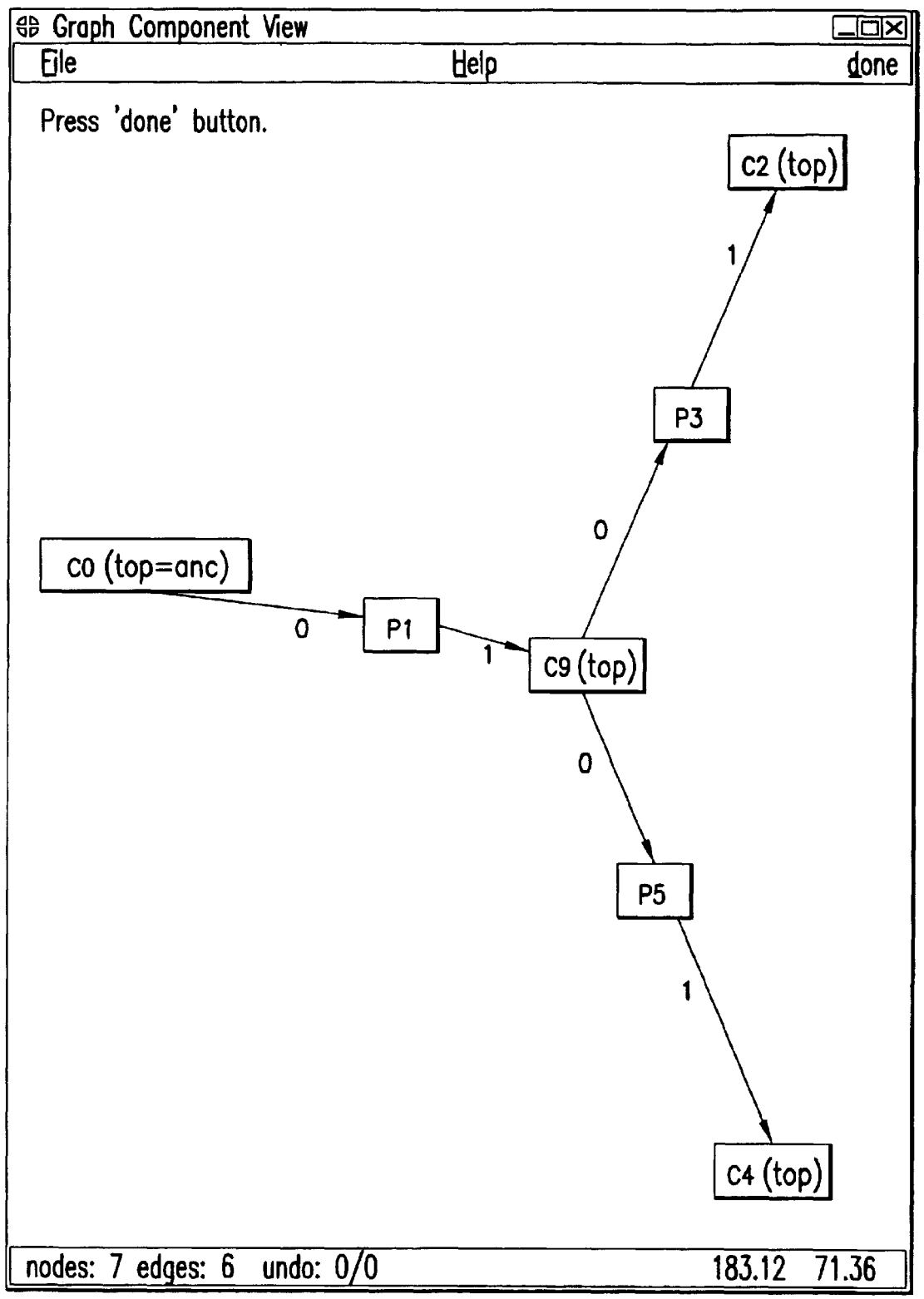
FIG. 20 shows the result of the triconnected component decomposition of the wire-frame shown in FIG. 19.

The input wire-frame for an open shell object such as a sheet metal part was generated by a CAD system and the generated input wire-frame is shown in FIG. 19. FIG. 20 shows the component graph resulted from the triconnected component decomposition of the wire-frame shown in FIG. 19. Characteristic values of the wire-frame shown in FIG. 19 are listed in Table V.

TABLE V

Characteristics of the wire-frame

| | |
|---|---|
| number of embeddings | 8 |
| number of face loops per embeddings | 28 |
| total number of face loop | 23 |
| number of face loop included in all of the embeddings | 35 |

Figure 21:
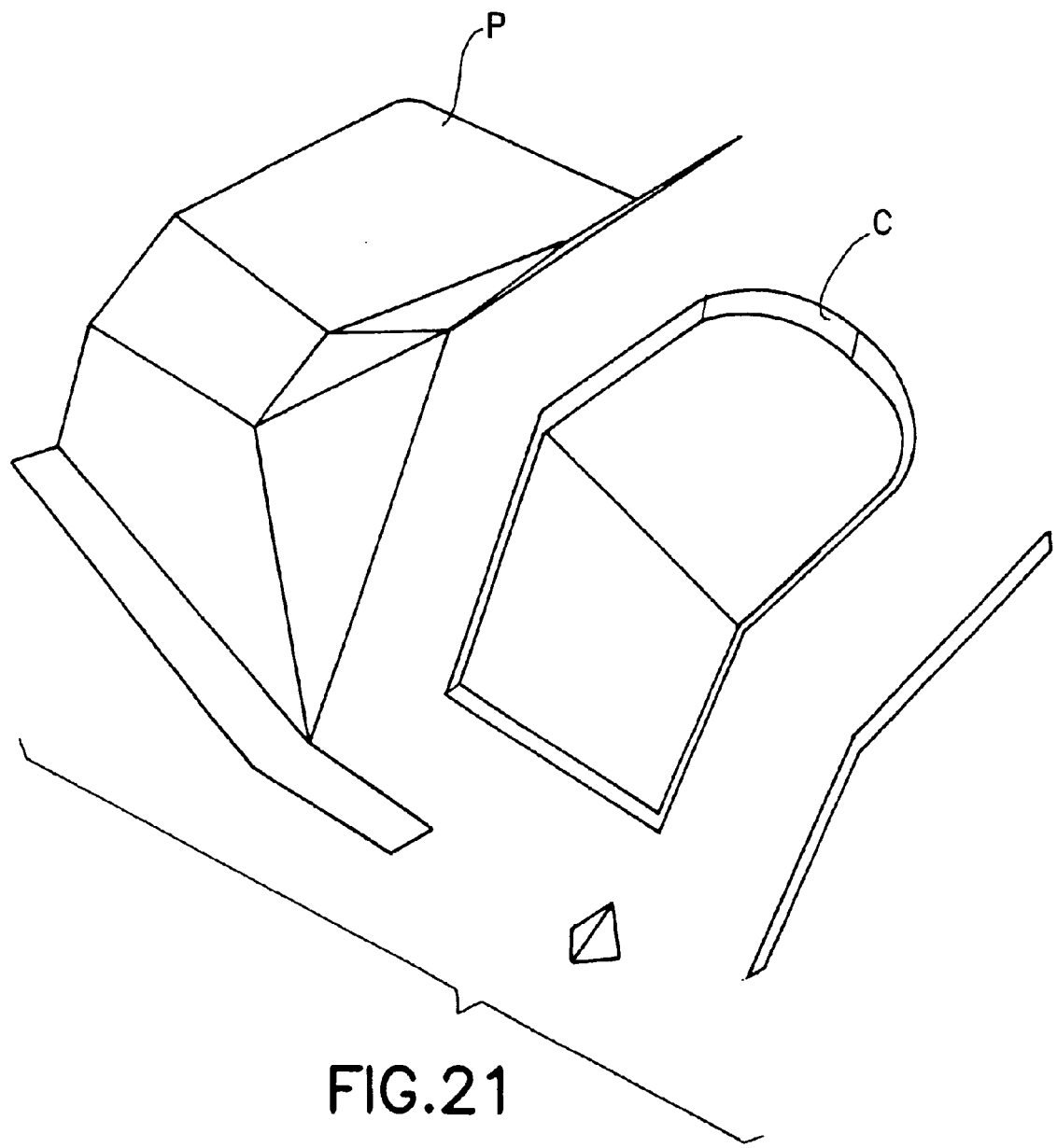
FIG. 21 shows the fixed 23 surfaces filled in the corresponding face loops according to the present invention.

Although the geometrical evaluation is not carried out at this stage at all, it was found that 23 face loops in the total 28 face loops was included in all of the embeddings, and hence it was concluded that these face loops have reasonably fixed. FIG. 21 shows the fixed 23 surfaces filled in the corresponding face loops. The 23 surfaces include planar surfaces P and other curved surfaces C as described in FIG. 21.

Figure 22:
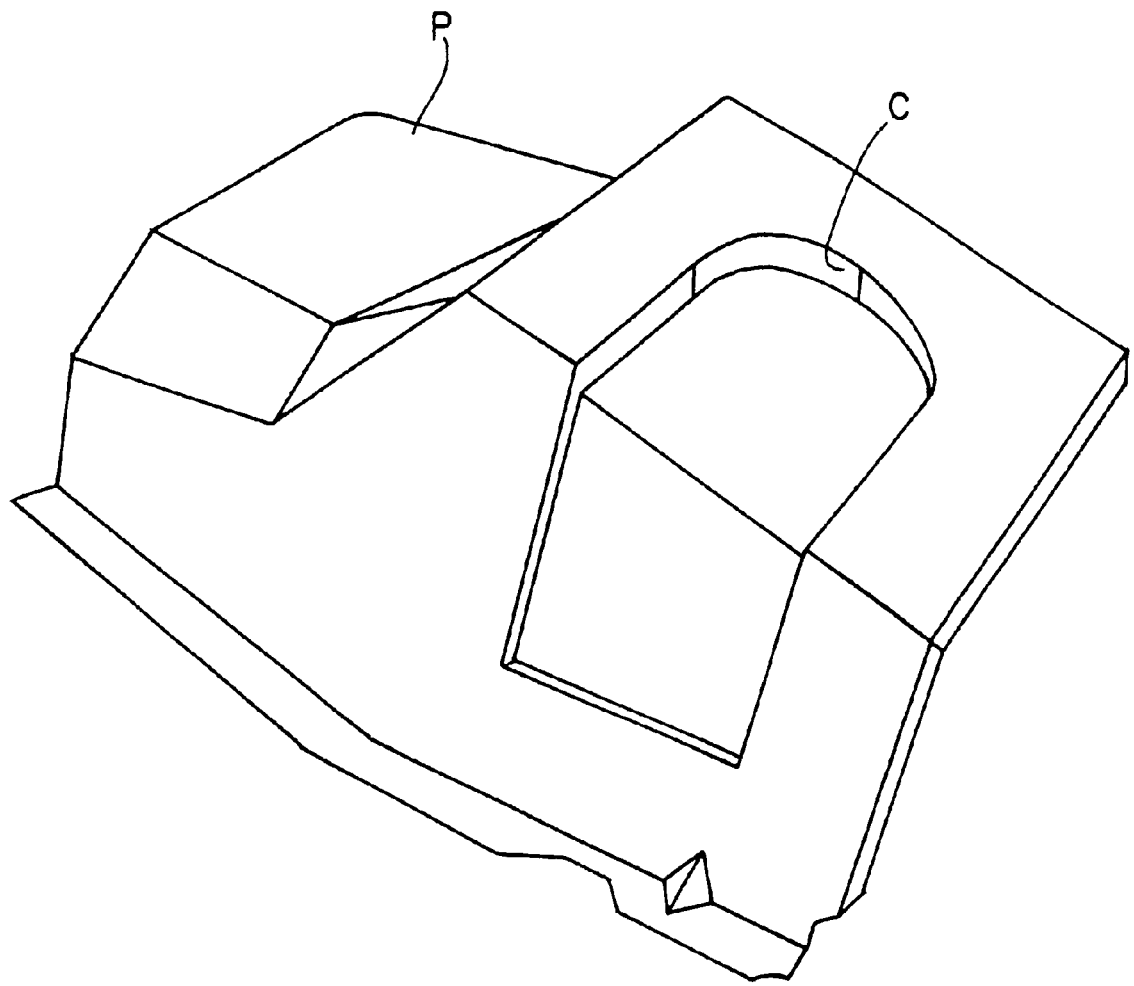
FIG. 22 shows an embodiment of the embedding of the highest rank reconstruct correctly the input wire-frame model according to the present invention.

The logic for determining the open shell was adopted whether or not the face loops satisfy the following inequalities;

$$\frac{S_{max}}{\sum_i S_i} > 0.30 \text{ and } \frac{S_{next}}{S_{max}} < 0.5$$

where $S_{max}$ and $S_{next}$ are the surface area of the largest face loop and the surface area of the second largest surface area, respectively. $S_i$ is an area of each face loop. It was found that all of the solutions indicated the wire-frame to be an open shell structure. The embeddings were ordered from small to large with respect to the total area of the shell, and the results listed in Table VI were obtained. The embedding of the highest rank reconstruct correctly the input wire-frame model as shown in FIG. 22 when compared with the input wire-frame shown in FIG. 19.

Computation time for the entire processing described above required about 1 second for the triconnected component decomposition and about 1 second for generation and evaluation of the entire embeddings by a personal computer implemented a CPU of Pentium-II (Intel, Trade Mark) with the clock rate of 400 MHz.

TABLE VI

Results for open shell structure

| number of embedding | open shell | area of largest face loop | ratio of area of largest face loop (%) | total area of open shell | number of planar loop |
|---|---|---|---|---|---|
| 1 | yes | 125,217.0 | 44.4 | 156,627.9 | 24 |
| 3 | yes | 125,217.0 | 44.4 | 157,033.6 | 22 |
| 0 | yes | 123,946.0 | 44.1 | 157,262.0 | 23 |
| 2 | yes | 123,946.0 | 44.0 | 157,667.7 | 21 |
| 5 | yes | 125,217.0 | 39.1 | 195,368.2 | 23 |
| 7 | yes | 125,217.0 | 39.0 | 195,814.4 | 22 |
| 4 | yes | 123,946.0 | 38.7 | 196,002.3 | 22 |
| 6 | yes | 123,946.0 | 38.7 | 196,448.6 | 21 |

As described above, the present invention improves efficiency and accuracy of the three-dimensional shape design. The computational cost of the present invention is estimated theoretically to be $O(|V|+|E|)$ and the cost is also estimated to be $O(|V|)$ for determination whether or not each partial graph is a planar graph. When the number of topologically possible embeddings is N, the computing time for testing such the embeddings is theoretically to be $O(|N|)$, and the cost for testing a particular embedding depends on the complexity of the input graph. Testing of each of face loops and the combination thereof which is large portions of the testing may be reduced to $O(\log N)$ by avoiding redundant evaluation inadequate embedding because the number of the face loops is $O(\log N)$ in the present invention. As the results, the present invention improves the cost of the computation less than or equal to the computation cost which is linearly expected by the numbers of vertices or edges, and the total number of the embeddings of the input wire-frame model. Therefore, the present invention may be possible to reduce the workload significantly.

The present invention also improves certainty of the reconstruction of three-dimensional shapes because the present invention distinguishes the group of faces having 100% certainty from the groups of faces having less certainty among the reconstructed face loops. Through experiments with typical wire-frame CAD models, it was found that the number of certain face loops is larger than 90% in most cases. In such cases, the present invention provides quite significant advantages because it is not necessary to examine consistency of all of the face loops.

In the present invention, there are some difficulties when the input wire-frame has face loops having large difference in size or when some face loops have complicated shapes. However, in such cases, the method according to the present invention may be quite effective when combined with the conventional interactive processes in which an operator adopts or discards the face loops including unsure face loops. Even if kinds of the curved surfaces which were filled in accordance with the criterion of "simplicity" are different from the intended ones, the present invention may reduce elaboration of the operator when filling the face loops with exact surfaces because the curved segments consisting of the face loops are already grouped by filling with any one of surfaces.

Hereinabove, the present invention has been described using specific embodiments depicted in the drawings, however the present invention is not limited to the described embodiments and examples. The present invention has also been explained using the method according to the present invention, however the present invention contemplates to include a system for executing the method according the present invention and a program product for executing the method according to the present invention.

It may also be appreciated by a person skilled in the art that many modifications, omissions, or other embodiments may be possible without departing the scope of the present invention.

What is claimed is:

1. A computer-implemented method for reconstructing surface geometry from discrete points on an object comprising steps of:

providing input data to a computer derived from said discrete points;

generating a graph from said input data, said graph including biconnected graphs;

subjecting said graph to triconnected component decomposition to generate a component graph;

generating all possible embeddings including possible face loops from said component graph;

filling said possible face loops with possible surfaces to reconstruct said surface geometry;

examining geometrical acceptance of said possible surfaces and omitting embeddings including at least one geometrically unacceptable surface from reconstruction and scoring said embeddings depending on said examination; and sorting said embeddings with respect to said scores to select embeddings for reconstructing said surface geometry.

2. The method according to the claim 1, wherein said discrete points forms a wire-frame corresponding to said object.

3. The method according to the claim 1, wherein said examining and scoring step of said embeddings includes steps of;

examining geometrical acceptance of said possible surfaces and scoring said face loops;

examining geometrical acceptance of combinations of said possible surfaces and scoring said combinations; and examining surface area of said embeddings and scoring said surface area.

4. The method according to the claim 3, wherein said step of examining geometrical acceptance of combinations of said possible surfaces utilize characteristics selected from the group consisting of a kind of surface, an area, and a variation rate and range of normal vectors of the possible surface or any combinations thereof and said step of examining said combinations of said possible surfaces utilizes other characteristics selected from the group consisting of an interference between said possible surfaces, a contact between said possible surface at edges, and an overlap between said possible surfaces or any combinations thereof.

5. The method according to the claim 1, wherein further comprising a step of discarding at least one acceptable face loop so as to reconstruct said surface geometry of an open shell structure.

6. The method according to the claim 5, wherein said at least one acceptable face loop is determined by the following formula;

$$\frac{S_{\max}}{\sum_i S_i} > 0.30 \text{ and } \frac{S_{next}}{S_{\max}} < 0.5$$

wherein $S_{max}$ and $S_{next}$ are a surface area of the largest face loop and a surface area of the second largest surface area, respectively and $S_i$ is an area of each face loop.

7. A computer based system for reconstructing surface geometry from discrete points on an object comprising;

means for providing input data to a computer derived from said discrete points;

means for generating a graph from said input data, said graph including biconnected graphs;

means for subjecting said graph to triconnected component decomposition to generate a component graph;

means for generating all possible embeddings including possible face loops from said component graph;

means for filling said possible face loops with possible surface to reconstruct said surface geometry;

means for examining geometrical acceptance of said possible surfaces and omitting embeddings including at least one geometrically unacceptable surface from reconstruction and scoring said embeddings depending on said examination; and means for sorting said embeddings with respect to said scores to select embeddings for reconstructing said surface geometry.

8. The system according to the claim 7, wherein said discrete points forms a wire-frame corresponding to said object.

9. The method according to the claim 7, wherein said means for examining and embeddings comprising;

means for examining geometrical acceptance of said possible surfaces and scoring said face loops;

means for examining geometrical acceptance of combinations of said possible surfaces and scoring said combinations; and means for examining surface area of said embeddings and scoring said surface area.

10. The system according to the claim 9, wherein said means for examining geometrical acceptance of said possible surfaces utilize characteristics selected from the group consisting of a kind of surface, an area, and a variation rate and range of normal vectors of the possible surface or any combinations thereof and said means for examining geometrical acceptance of combinations of said possible surfaces utilizes other characteristics selected from the group consisting of an interference between said possible surfaces, a contact between said possible surface at edges, and an overlap between said possible surfaces or any combinations thereof.

11. The system according to the claim 9, wherein further comprising means for discarding at least one acceptable face loop so as to reconstruct said surface geometry of an open shell structure.

12. The system according to the claim 7, wherein said at least one acceptable face loop is determined by the following formula;

$$\frac{S_{\max}}{\sum_i S_i} > 0.30 \text{ and } \frac{S_{next}}{S_{\max}} < 0.5$$

wherein $S_{max}$ and $S_{next}$ are a surface area of the largest face loop and a surface area of the second largest surface area, respectively and $S_i$ is an area of each face loop.

13. The system according to the claim 7, wherein said system is a computer aided design system.

14. A computer readable program product for reconstructing surface geometry from discrete points on an object comprising;

providing input data derived from said discrete points;

generating a graph from said input data, said graph including biconnected graphs;

subjecting said graph to triconnected component decomposition to generate a component graph;

generating all possible embeddings including possible face loops from said component graph;

filling said possible face loops with possible surface to reconstruct said surface geometry;

examining geometrical acceptance of said possible surfaces and omitting embeddings including at least one geometrically unacceptable surface from reconstruction and scoring said embeddings depending on said examination; and sorting said embeddings with respect to said scores to select embeddings for reconstructing said surface geometry.

15. The program product according to the claim 14, wherein said discrete points forms a wire-frame corresponding to said object.

16. The program product according to the claim 14, wherein said means for examining and embeddings comprising;

examining geometrical acceptance of said possible surfaces and scoring said face loops;

examining geometrical acceptance of combinations of said possible surfaces and scoring said combinations; and examining surface area of said embeddings and scoring said surface area.

17. The program product according to the claim 16, wherein said means of examining geometrical acceptance of combinations of said possible surfaces utilize characteristics selected from the group consisting of a kind of surface, an area, and a variation rate and range of normal vectors of the possible surface or any combinations thereof and said step of examining said combinations of said possible surfaces utilizes other characteristics selected from the group consisting of an interference between said possible surfaces, a contact between said possible surface at edges, and an overlap between said possible surfaces or any combinations thereof.

18. The system according to the claim 16, wherein further comprising a step of discarding at least one acceptable face loop so as to reconstruct said surface geometry of an open shell structure.

19. The system according to the claim 14, wherein said at least one acceptable face loop is determined by the following formula;

$$\frac{S_{max}}{\sum_i S_i} > 0.30 \text{ and } \frac{S_{next}}{S_{max}} < 0.5$$

wherein $S_{max}$ and $S_{next}$ are a surface area of the largest face loop and a surface area of the second largest surface area, respectively and $S_i$ is an area of each face loop.

20. The program product according to the claim 14, wherein said program product is implemented in a computer aided design system.

* * * * *